(12) United States Patent
Allen et al.

(10) Patent No.: US 11,414,549 B2
(45) Date of Patent: Aug. 16, 2022

(54) AGE RESISTANT COATINGS AND METHODS FOR TREATING ROADWAY SUBSTRATES

(71) Applicant: Blacklidge Emulsions Inc., Gulfport, MS (US)

(72) Inventors: Robert Grover Allen, Biloxi, MS (US); Henry Cuevas, Long Beach, MS (US); Roy Brittany Blacklidge, Gulfport, MS (US); Swathi Theeda, Biloxi, MS (US)

(73) Assignee: Blacklidge Emulsions, Inc., Gulfport, MS (US)

( * ) Notice: Subject to any disclaimer, the term of this patent is extended or adjusted under 35 U.S.C. 154(b) by 806 days.

(21) Appl. No.: 15/844,917

(22) Filed: Dec. 18, 2017

(65) Prior Publication Data

US 2018/0171147 A1     Jun. 21, 2018

Related U.S. Application Data

(63) Continuation-in-part of application No. 15/844,838, filed on Dec. 18, 2017.
(Continued)

(51) Int. Cl.
*C08L 95/00* (2006.01)
*G01N 21/35* (2014.01)
(Continued)

(52) U.S. Cl.
CPC .............. *C08L 95/005* (2013.01); *C10G 7/04* (2013.01); *C10G 7/06* (2013.01);
(Continued)

(58) Field of Classification Search
CPC ............................... C08L 95/00; C08L 95/005
See application file for complete search history.

(56) References Cited

U.S. PATENT DOCUMENTS

| 5,769,567 A | | 6/1998 | Durand et al. |
| 6,117,926 A | * | 9/2000 | Engber .................. C08L 95/00 524/59 |

(Continued)

FOREIGN PATENT DOCUMENTS

| CA | 1321276 C | 8/1993 |
| EP | 2487207 A2 | 8/2012 |
| WO | 2016170083 A1 | 10/2016 |

OTHER PUBLICATIONS

Loeber et al. "Bitumen in colloid science: a chemical, structural and rheological approach". Fuel vol. 77, No. 13, pp. 1443-1450 (1998). PII: S0016-2361(98)00054-5 (Year: 1998).*

(Continued)

*Primary Examiner* — Alexandra M Moore
(74) *Attorney, Agent, or Firm* — Patterson Intellectual Property Law, P.C.; William E. Sekyi

(57) ABSTRACT

Aging resistant emulsified asphalt compositions and related methods of preparing and applying the same for use in asphalt treatment and paving applications. The aging resistant emulsified asphalt compositions can include an aging resistant asphalt composition, emulsifier, and water. The resulting residue formed when the emulsified asphalt composition has cured is aging resistant and can be resistant to age-induced cracking even after simulated aging of 14 years and 21 years. Appropriate use of emulsifiers in some embodiments can further improve aging resistance in the residues.

16 Claims, 9 Drawing Sheets

Related U.S. Application Data

(60) Provisional application No. 62/436,306, filed on Dec. 19, 2016.

(51) Int. Cl.
   *C10G 7/06* (2006.01)
   *C10G 7/04* (2006.01)

(52) U.S. Cl.
   CPC . *C10G 2300/1077* (2013.01); *C10G 2400/16* (2013.01); *G01N 2021/3595* (2013.01)

(56) References Cited

U.S. PATENT DOCUMENTS

| | | | | |
|---|---|---|---|---|
| 8,821,064 | B1 * | 9/2014 | Morris | C08L 95/005 404/75 |
| 2009/0133604 | A1 | 5/2009 | Fischer et al. | |
| 2010/0275817 | A1 | 11/2010 | Williams et al. | |
| 2012/0063843 | A1 | 3/2012 | Blacklidge | |
| 2015/0008156 | A1 | 1/2015 | Martin et al. | |
| 2016/0362338 | A1 | 12/2016 | Reinke et al. | |

OTHER PUBLICATIONS

Australian Office Action for corresponding Patent Application No. 2017378888, dated Apr. 6, 2020, 6 pages.

Reinke et al., "Impact of re-refined engine oil bottoms on binder properties and mix performance on two pavements in Minnesota", E & E Congress 2016, 6th Eurasphalt & Eurobitume Congress, Jun. 1-3, 2016.

Shamborovskyy, "Development of a Fatigue-Based Asphalt Binder Purchase Specification for Airfield Asphalt", Graduate School—New Brunswick Rutgers, The State University of New Jersey, May 2016.

PCT search report and opinion of PCT application No. PCT/US2017/067138, dated May 15, 2018, 16 pages.

Amy L. Epps, Charles J. Glover, and Roberto Barcena, A Performance-Graded Binder Specification for Surface Treatments, Research: Aug. 1999-Aug. 2001, Report Date: Oct. 2001, 70 pages, FHWA/TX-02/1710-1, Texas Department of Transportation Research and Technology Implementation Office, Austin, Texas.

NAPA, Performance Graded Asphalt Binder Specification (from AASHTO MP 1), Dec. 9, 2017, 1 page, Virtual Superpave Laboratory, The National Asphalt Pavement Association, Landam, Maryland, Lanham, MD.

R. Michael Anderson, Gayle N. King, Douglas I. Hanson, and Phillip B. Blankenship, Evaluation of the Relationship between Asphalt Binder Properties and Non-Load Related Cracking, 2011, 35 pages, Abstract, Airfield Asphalt Pavement Technology Program, Auburn, Alabama.

Y. Ruan, R. R. Davison and C. J. Glover, An Investigation of Asphalt Durability: Relationships between Ductility and Rheological Properties for Unmodified Asphalts, Petroleum Science and Technology, 2003, 25 pages, Abstract, Marcel Dekker, Inc., New York, New York.

Robert Grover Allen, Microstructural Characterization of the Chemomechanical Behavior of Asphalt in Terms of Aging and Fatigue Performance Properties, A Dissertation, May 2013, 162 pages, Office of Graduate Studies of Texas A&M University, College Station, Texas.

The Asphalt Institute, The Use of REOB/VTAE in Asphalt, State-of-the-Knowledge, Apr. 12-13, 2016, 92 pages, IS-235, The Asphalt Institute's Technical Advisory and Health, Safety & Environment Committees, Lexington, Kentucky.

R. Grover Allen, Upping the Ante: What Binder Modification Can do to Impact Performance, NAPA Paving for Performance "Designed to Perform", Oct. 13, 2017, 31 pages, Blacklidge Emulsions, Douglasville, Georgia.

Scott Shuler, Anthony Lord, Amy Epps-Martin, Denise Hoyt, Manual for Emulsion-Based Chip Seals for Pavement Preservation, National Cooperative Highway Research Program Report 680, 2011, 110 pages, National Academy of Sciences, Washington, DC.

Geoffrey Rowe, Prepared discussion for the AAPT paper by Anderson et al.: Evaluation of the relationship between asphalt binder properties and non-load related cracking, Journal of the Association of Asphalt Paving Technologists 80, 649-662, 2011, 11 pages, AAPT, Lino Lakes, Minnesota.

Zane L. Webb, Seal Coat and Surface Treatment Manual, May 1, 2010, 162 pages, Maintenance Division of the Texas Department of Transportation, Austin, Texas.

Prithvi S. Kandhal, Leo D. Sandvig and Monroe E. Wenger, Shear Susceptibility of Asphalts in Relation to Pavement Performance, Journal of the Association of Asphalt Paving Technologists, Asphalt Paving Technology vol. 42, 1973, 27 pages, Abstract, AAPT, Lino Lakes, Minnesota.

Prithvi S. Kandhal and William C. Koehler, Significant Studies on Asphalts Durability: Pennsylvania Experience, Transportation Research Record 999, 1981, 10 pages, Abstract, Transportation Research Board, Washington DC.

Prithvi S. Kandhal, Low-Temperature Ductility in Relation to Pavement Performance, Low-Temperature Properties of Bituminous Materials and Compacted Bituminous Paving Mixtures, American Society for Testing and Materials, 1977, 12 pages, Abstract, ASTM International, West Conshohocken, Pennsylvania.

Moon-Sun Lin, Jay M. Chaffin, Meng Liu, C.J. Glover, R.R. Davison and J.A. Bullin, The Effect of Asphalt Composition on the Formation of Asphaltenes and their Contribution to Asphalt Viscosity, 1996, 27 pages, Abstract, Department of Chemical Engineering, Texas A&M University, College Station, Texas.

Malcolm L. Williams, Robert F. Landel, and John D. Ferry, The Temperature Dependence of Relaxation Mechanisms in Amorphous Polymers and Other Glass-forming Liquids, Jul. 20, 1955, 7 pages, The Journal of the American Chemical Society, Washington DC.

Harold L. Von Quintus, Jag Mallela, and Jane Jiang, Expected Service Life and Performance Characteristics of HMA Pavements in LTPP, Final Report, Feb. 2005, 64 pages, Asphalt Pavement Alliance, Orange Park, Florida.

European Office Action for corresponding EP 17 88 2948, dated Aug. 13, 2020, 7 pages.

Office Action for corresponding Indian application No. 201917027015, dated Nov. 6, 2020, 6 pages.

M.N. Siddiqui, M.F. Ali; "Studies on the aging behavior of the Arabian asphalts," Fuel 78 (1999), p. 1005-1015.

* cited by examiner

Asphalt Performance Grade (PG) Standards – Asphalt Institute.

| | PG 46 | PG 52 | PG 58 | PG 64 | PG 70 | PG 76 | PG 82 |
|---|---|---|---|---|---|---|---|
| Max. Design Temp. | 46 | 52 | 58 | 64 | 70 | 76 | 82 |
| Min. Design Temp. | 34,40,46 -10,-16,-22,-28,-34 | -10,-16,-22,-28,-34,-40,-46 | -16,-22,-28,-34,-40 | -10,-16,-22,-28,-34,-40 | -10,-16,-22,-28,-34,-40 | -10,-16,-22,-28,-34 | -10,-16,-22,-28,-34 |

Original

| Flash Point | = 230 °C |
| Rotational Viscosity | = 3 Pa·s @ 135°C |
| DSR G*/sin δ (Dynamic Shear Rheometer) | = 1.00 kPa |

| | 46 | 52 | 58 | 64 | 70 | 76 | 82 |
|---|---|---|---|---|---|---|---|

(Rolling Thin Film Oven) RTFO, Mass Change ≤ 1.00%

| DSR G*/sin δ (Dynamic Shear Rheometer) | = 2.20 kPa |

| | 46 | 52 | 58 | 64 | 70 | 76 | 82 |
|---|---|---|---|---|---|---|---|

(Pressure Aging Vessel) PAV

| 20 hours, 2.10 MPa | 90 | 90 | 100 | 100 | 100(110) | 100(110) | 100(110) |

| DSR G*·sin δ (Dynamic Shear Rheometer) | = 5000 kPa | Intermediate Temp. = [(Max. + Min.)/2] + 4 |

| | 10 | 7 | 4 | 25 | 22 | 19 | 16 | 13 | 10 | 7 | 25 | 22 | 19 | 16 | 13 | 31 | 28 | 25 | 22 | 19 | 16 | 34 | 31 | 28 | 25 | 22 | 19 | 37 | 34 | 31 | 28 | 25 | 22 | 40 | 37 | 34 | 31 | 28 |

BBR S (creep stiffness) & m-value (Bending Beam Rheometer)
S = 300 kPa
m = 0.300

| | -24,-30,-36 | 0,-6,-12,-18,-24,-30,-36 | -6,-12,-18,-24,-30,-36 | -6,-12,-18,-24,-30 | 0,-6,-12,-18,-24,-30 | 0,-6,-12,-18,-24 | 0,-6,-12,-18,-24 |

If BBR m-value = 0.300 and creep stiffness is between 300 and 600, the Direct Tension Failure strain requirement can be used in lieu of the creep stiffness requirement.

| DTT (Direct Tension Tester) | $\varepsilon_f$ = 1.00% |

| | -24,-30,-36 | 0,-6,-12,-18,-24,-30,-36 | -6,-12,-18,-24,-30,-36 | -6,-12,-18,-24,-30 | 0,-6,-12,-18,-24,-30 | 0,-6,-12,-18,-24 | 0,-6,-12,-18,-24 |

*FIG. 6 (Prior Art)*

AGE RESISTANT COATINGS AND METHODS FOR TREATING ROADWAY SUBSTRATES

CROSS-REFERENCE TO RELATED APPLICATIONS

This application is a continuation-in-part of U.S. application Ser. No. 15/844,838, filed Dec. 18, 2017, which claims the benefit of U.S. Provisional Application No. 62/436,306, filed on Dec. 19, 2016.

FIELD OF THE INVENTION

The present invention is generally directed toward improved emulsified asphalt residue coatings and methods for treating roadway substrates with the same, and, more specifically, to surface treatments having improved age-resistant qualities thereby reducing the frequency and cost associated with pavement preservation.

BACKGROUND OF THE INVENTION

Asphalts can be emulsified by milling together asphalt, water, emulsifiers and, often, additional additives to form emulsions. Some of the most prevalent uses and applications of asphalt emulsions are in road construction and paving. These applications include surface treatments in which asphalt emulsion can be applied to a paving surface. The emulsified asphalt forms a layer which subsequently cures to form a dry asphalt emulsion residue coating on the pavement surface.

Emulsified asphalt surface treatments are commonly used as maintenance, stopgap, and preservation strategies to combat the high cost of asphalt concrete (AC) overlays or roadway reconstruction using AC mixtures. Surface treatments are most prevalent on low-volume roadways but are also applied for use on major highways.

Surface treatments, themselves, are still susceptible to failure and maintenance costs. Surface treatments typically do not fail due to structural reasons, but rather due to reasons stemming from age hardening and embrittlement of the emulsified asphalt residue coating. After placing an emulsified asphalt treatment into service, the coating formed from the asphalt emulsion residue degrades and hardens significantly due to volatilization, oxidation, and other types of aging, including polymerization, thixotropy, syneresis, and separation relative to a variety of exposure factors including air, temperature, UV radiation, and moisture. Therefore, the emulsified asphalt residue coating exposed to the environmental elements quickly loses ductility and relaxation properties, causing it to become weaker, more brittle, and unreliable over a relatively short period. The emulsified asphalt residue coating, including any aggregates that may accompany the coating, then possesses little value to the end-user and must be replaced with a new coating, which happens recurrently; hence the term "treatment" as opposed to "rehabilitation" or "restoration."

Due to a combination of the extremely complex and diverse chemical nature of asphalt and the complex and diverse chemistries of surface active agents (surfactants) and other additives commonly added to asphalt emulsions, the rate at which age hardening and breakdown of an emulsified asphalt residue coating occurs is highly variable. Yet, the failure is typically rapid and mostly disregarded by emulsion specifications in the emulsified asphalt industry. Surfactant (emulsifier) chemicals and additives are needed to aide in the dispersion, suspension and, in some instances, stabilization of emulsified asphalt. Additional additives may also be included in the emulsion, such as peptizers, which make certain asphalts easier to emulsify, or those additives that alter application variables such as adhesion promotion and break/set time, among others. What is broadly understood is that most emulsified asphalt surface treatments begin to show significant signs of aging and deterioration within approximately 1 to 7 years.

As alluded to earlier, the term treatment is used to describe these emulsified asphalt-based applications, because they are routinely repeated at frequencies and costs which are not insignificant to the tax payer/end-user. There is a vital need to reduce the regularity in which these treatments are currently being applied due specifically to their aging-related chemical breakdown. Chemists, chemical engineers, civil engineers, and other skilled artisans involved in asphalt research, development, and engineering have attempted for decades to draw correlations between non-emulsified (non-aqueous-based) asphalt chemistry and observed rheological properties and performance of AC mixtures and pavements. One such approach to study asphalt chemistry is to divide asphalt into four unique fractions, SARA—Saturates, Naphthene Aromatics, Polar Aromatics (Resins), and Asphaltenes, according to ASTM D 4124 or IP 143 followed by IP 469. Despite extensive use of this method, "no such correlations exist between the various single chemical components, saturates, polars, asphaltenes, and their measured rheological properties." (see Netzel, D. A., Miknis, F. P., Thomas, K. P., Wallace, Jr., J. C., and Butcher, C. H. Molecular Motions and Rheological Properties of Asphalts: An NMR Study. *Asphalt Science and Technology*, Chapter 2 pp. 11-58, Usmani, A., ed. (Marcei Dekker: New York, N.Y., 1997).). U.S. Provisional Patent Application No. 62/436,306 by Allen et al., filed on Dec. 19, 2016 and incorporated herein by reference in its entirety (the "'306 application"), disclosed various short- and long-term aging techniques and asphalt chemical analyses aimed at improving asphalt aging resistance despite the conventional notion outlined in Usmani (1997) that correlations did not exist between various chemical fractions and measured rheological properties. The '306 application revealed strong correlations between various asphalt chemical fractions and asphalt age-susceptibility, which led to improved age-resistant asphalts, non-aqueous asphalt mixtures, and methods of achieving the same.

Emulsified asphalts exist, in part, because of the convenience they provide—emulsified asphalts can be stored, transported, and applied without the need for continuous high temperatures necessary to make asphalt flow. However, asphalts used to make emulsions are typically more age-susceptible than asphalts used in non-aqueous pavement mixture applications. Historically, and presently, this is due to enhanced focus on providing convenience (success of emulsion storage, handling, transport, and application) in lieu of providing performance-based emulsified asphalt residue properties. Improvement to long-term aging resistance of emulsified asphalt residue coatings is an area of direct need to improve methods of treating substrates and roadway surfaces, thereby increasing longevity and significantly reducing the life-cycle cost associated with pavement preservation treatments.

SUMMARY OF THE INVENTION

According to some embodiments, a method of the invention includes providing an aging resistant emulsified asphalt composition which includes an aging resistant asphalt, water and an emulsifier that can be applied to a roadway surface. The aging resistant emulsified asphalt composition forms a coating of emulsion residue when applied to the substrate surface and cured. Preferably, the emulsion residue has a measured change in BBR failure temperature between RTFO plus 20-hour PAV-aging and an RTFO plus 40-hour PAV-aging of less than about 3.5° C. According to these embodiments, the method further includes applying the aging resistant emulsified asphalt composition to a roadway surface to form an emulsion residue coating.

According to other embodiments, the invention provides a coating for a roadway surface with improved resistance to short-term and long-term aging caused by volatilization, oxidation, polymerization, thixotropy, syneresis, or separation of components of the roadway. These causes of aging can in turn be caused by the roadway's exposure to air, temperature, UV radiation, and water. The emulsified asphalt composition (or, more simply, emulsified asphalt) of the present invention typically includes a first phase of aging resistant asphalt composition comprising about 30% to about 70% aging resistant asphalt composition based on the total weight of the emulsion. It should be understood that different treatment products will use different ranges within this broader range; for example, a fog seal has about 30% asphalt and a chip seal emulsion has about 68% asphalt. The aging resistant asphalt composition is an asphalt composition having a colloidal index (CI) within the range of about 2.5 to about 8.0 (preferably between about 2.8 and 8.0 and most preferably between 3.7 and 8.0) and a measured change in BBR failure temperature between an RTFO plus 20-hour PAV-aged residue sample of the modified asphalt composition and an RTFO plus 40-hour PAV-aged residue sample of the modified asphalt composition is less than about 3.5° C.

As used herein, CI is determined by the following equation:

$$CI=((NA+PA)/(S+A))$$

where NA is the proportion or percentage by weight of naphthene aromatics, PA is the proportion or percentage by weight of polar aromatics, S is the proportion or percentage by weight of saturates, and A is the proportion or percentage by weight of asphaltenes.

In preferred embodiments, the aging resistant asphalt compositions have a SARA fraction composition of about 40% to about 60% by weight naphthene aromatics, about 25% to about 45% by weight polar aromatics, about 3% to about 8% by weight saturates, and about 3% to about 15% by weight asphaltenes. In some preferred embodiments, the aging resistant asphalt compositions have a paraffin wax level of less than about 0.5%. In particularly preferred embodiments, the aging resistant asphalt compositions further meet or exceed minimum specification requirements for a conventional paving grade asphalt.

In some preferred embodiments, the aging resistant asphalt composition has a penetration value of between about 40 dmm and about 220 dmm at 25° C. In other preferred embodiments, the aging resistant asphalt composition has a SARA fraction composition of about 40% to about 60% by weight naphthene aromatics, about 25% to about 45% by weight polar aromatics, about 3% to about 8% by weight saturates, and about 3% to about 15% by weight asphaltenes.

The aging resistant asphalt composition would also preferably have a measured difference between a high-temperature PG grade failure temperature from an original sample (i.e., a sample of non-aged or not aged by aging simulation methods) of the asphalt composition and a high-temperature PG grade failure temperature from an RTFO-aged residue sample of the modified asphalt composition of less than about 1.5° C. Additionally, the asphalt composition would also preferably have a measured ΔTc of an RTFO plus 40-hour PAV-aged residue sample of the asphalt composition greater than about –3.5° C.

In another aspect, the aging resistant asphalt composition would have a measured ΔTc of an RTFO plus 60-hour PAV-aged residue sample of the aging resistant asphalt composition greater than about –6.0° C. The asphalt composition would also preferably have a measured change in BBR failure temperature between an RTFO plus 20-hour PAV-aged residue sample of the asphalt composition and an RTFO plus 60-hour PAV-aged residue sample of the asphalt composition of less than about 8.0° C.

In yet another aspect, the aging resistant asphalt composition would have a measured Δ Failure Temp, ° C. (G*(sin δ)) between an RTFO plus 20-hour PAV-aged residue sample of the asphalt composition and an RTFO plus 40-hour PAV-aged residue sample of the asphalt composition of less than about 2.0° C. The aging resistant asphalt composition would also preferably have a measured Δ Failure Temp, ° C. (G*(sin δ)) between an RTFO plus 20-hour PAV-aged residue sample of the aging resistant asphalt composition and an RTFO plus 60-hour PAV-aged residue sample of the aging resistant asphalt composition of less than about 4.5° C.

In additional preferred embodiments, the aging resistant asphalt composition contains a measured G-R parameter value of less than 500.0 kPa at 15° C. and 0.005 rad/s of an RTFO plus 60-hour PAV-aged residue sample of the aging resistant asphalt composition. In another aspect, the aging resistant asphalt composition contains a measured G-R parameter value of less than 350.0 kPa at 15° C. and 0.005 rad/s of an RTFO plus 40-hour PAV-aged residue sample of the aging resistant asphalt composition. In yet another aspect, the aging resistant asphalt composition contains a crossover temperature of less than 32° C. calculated from the parameters of master curve developed with G-R frequency sweep test data at 15° C. reference temperature of an RTFO plus 60-hour PAV-aged residue sample of the aging resistant asphalt composition.

In additional preferred embodiments, the aging resistant asphalt composition contains crossover temperature of less than 30° C. calculated from the parameters of master curve developed with G-R frequency sweep test data at 15° C. reference temperature of an RTFO plus 40-hour PAV-aged residue sample of the aging resistant asphalt composition. In another aspect, a measured change in the naphthene aromatics fraction of a non-aged (original) sample of the aging resistant asphalt composition and an RTFO plus 60-hour PAV-aged residue sample of the aging resistant asphalt composition is less than about 45 percent. Additionally, a measured change in the polar aromatics (resins) fraction of a non-aged (original) sample of the aging resistant asphalt composition and an RTFO plus 60-hour PAV-aged residue sample of the aging resistant asphalt composition is less than about 100 percent. In yet another aspect, a measured change in the asphaltenes fraction of a non-aged (original) sample of the modified asphalt composition and an RTFO plus 60-hour PAV-aged residue sample of the modified asphalt composition is less than about 25 percent. Additionally, a measured change in the colloidal index (CI) of a non-aged (original) sample of the modified asphalt composition and an RTFO plus 60-hour PAV-aged residue sample of the modified asphalt composition is less than about 25 percent.

The emulsions of the present invention generally comprise a second aqueous phase which can be about 30% to about 70% of the total emulsion weight, and this second phase also may include emulsifier(s), and/or stabilizer(s), and/or other additive(s), in the amounts of about 0.1% to about 5% of the total weight of emulsion. The emulsions of the present invention optionally may further comprise stabilizing additives and additives providing an anionic, cationic, or neutral (non-ionic) character to the final emulsion. The proper emulsifier package may be selected from numerous chemical manufacturers supplying hundreds of pre-existing and newly developed emulsifier offerings each year designed for specific emulsion functions, i.e., rapid set (RS), quick set (QS), and slow set (SS) emulsions.

Cationic emulsifiers are often derived from tallow amine, oleic acid, and other sources and can be reacted with hydrochloric, phosphoric, or other acid to create an emulsifying solution. Anionic emulsifiers are commonly derived from tall oil, tall oil resins, lignosulphonate, and other sources and reacted with sodium or potassium hydroxide or other catalysts. Non-ionic (neutral) emulsifiers are less common in the asphalt emulsion industry. Most emulsifiers commonly contain one or more of the following components or by-products through various reactions: tallow diamine, tallow diquaternary, ethoxylates, oleic acid, soy, quaternary ammonium salts, ammonia, alkoxylates, carboxylate, sulfonates, triglycerides, modified diamine, fatty amines, fatty acids, linear fatty acids, rosin acids, nonylphenyl, tall oil acid, tall oil imidazoline, lignin, ligninamines, imidazolines, and amidoamines. The emulsifier chemical makeup, activity level, loading rate, and compatibility with other emulsion components and asphalts, among other factors, will impact the properties of the emulsified asphalt residue coating. A person of skill in the art will be familiar with the process of selecting an emulsifier for a stated end-use purpose, which may involve consulting with chemists and/or chemical engineers employed by the chemical companies supplying the emulsifiers. The chemical and physical properties of the aging resistant asphalt composition providing the first aging resistant asphalt composition phase, and the emulsifiers and optional stabilizers/additives so that the asphalt composition may be combined with the secondary aqueous phase at temperatures and under mixing and milling conditions that produce a successful, stable emulsion and, subsequently, a successful, age-resistant coating as described herein after application to a substrate and curing.

In some embodiments, the aging resistant asphalt emulsion includes an emulsifier having a chemical composition substantially devoid of free hydroxide anions (OH⁻), intramolecular hydrogen bonds, and intermolecular hydrogen bonds associated with a hydroxyl group (—OH - - - H) as determined by Fourier Transform Infrared ("FTIR") spectroscopy (ASTM E1252-98(2013)e1). In other preferred embodiments, chemical composition of the emulsifier is substantially devoid of intermolecular hydrogen bonds associated with a primary amine (—NH$_2$), a secondary amine (—NH), and an amide (R—CO—NH2). Further, in certain aspects, the emulsifier is substantially devoid of unsaturated nitrogen associated with a carbon atom or an alkyl group or an aryl group or as a cyclic compound (cyclic amine). In most preferred embodiments, the emulsifier is substantially devoid of unsaturated carbon in the form of ketone or carboxylic acid or dicarboxylic anhydrides. In some preferred embodiments, the emulsifier is substantially devoid of ester groups in the form of formates or acetates or benzoates. In some preferred embodiments, the emulsifier may contain a polymer group such as styrene-butadiene-styrene (SBS).

In another aspect, a method is provided for applying the aging resistant emulsified asphalt to a substrate and, after curing or having the water and/or volatile components removed, an emulsified asphalt residue composition remains that contains at least an emulsifier as described herein and also has a measured change in BBR failure temperature between an RTFO plus 20-hour PAV-aged residue sample of the emulsified asphalt residue composition and an RTFO plus 40-hour PAV-aged residue sample of the emulsified asphalt residue composition of less than about 3.5° C. The emulsified asphalt residue composition would also preferably have a measured difference between a high-temperature PG grade failure temperature from an original sample of the emulsified asphalt residue composition and a high-temperature PG grade failure temperature from an RTFO-aged residue sample of the emulsified asphalt residue composition of less than about 1.5° C.

In another aspect, the aging resistant emulsified asphalt is applied to a substrate and, after curing or having the water and/or volatile components removed, the remaining emulsified asphalt residue composition has a colloidal index within the range of about 2.5 to about 8.0 (preferably between about 2.8 and 8.0 and most preferably between 3.7 and 8.0) and additionally, the emulsified asphalt residue composition would also preferably have a measured ΔTc of an RTFO plus 40-hour PAV-aged residue sample of the emulsified asphalt residue composition greater than about −3.5° C.

In another aspect, the aging resistant emulsified asphalt is applied to a substrate and, after curing or having the water and/or volatile components removed, the remaining emulsified asphalt residue composition has a measured ΔTc of an RTFO plus 60-hour PAV-aged residue sample of the emulsified asphalt residue composition greater than about −5.0° C. The emulsified asphalt residue composition would also preferably have a measured change in BBR failure temperature between an RTFO plus 20-hour PAV-aged residue sample of the emulsified asphalt residue composition and an RTFO plus 60-hour PAV-aged residue sample of the emulsified asphalt residue composition of less than about 5.5° C.

In yet another aspect, the aging resistant emulsified asphalt is applied to a substrate and, after curing or having the water and/or volatile components removed, the remaining emulsified asphalt residue composition has a measured Δ Failure Temp, ° C. (G*(sin δ)) between an RTFO plus 20-hour PAV-aged residue sample of the emulsified asphalt residue composition and an RTFO plus 40-hour PAV-aged residue sample of the emulsified asphalt residue composition of less than about 2.0° C. The emulsified asphalt residue composition would also preferably have a measured Δ Failure Temp, ° C. (G*(sin δ)) between an RTFO plus 20-hour PAV-aged residue sample of the emulsified asphalt residue composition and an RTFO plus 60-hour PAV-aged residue sample of the emulsified asphalt residue composition of less than about 4.5° C.

The aging resistant emulsified asphalt composition can then be used as a direct replacement in known emulsified asphalt surface treatment applications, including, but not limited to, fog seals, chip seal emulsions, scrub seals, slurry seals, and microsurfacing. The aging resistant emulsified asphalt composition may be spray-applied, broomed, painted, brushed, scrubbed, or squeegee-applied at a rate ranging from about 0.01 gal/sy (0.05 L/m$^2$) to about 0.60 gal/sy (2.72 L/m$^2$).

BRIEF DESCRIPTION OF THE DRAWINGS

Further advantages of the invention will become apparent by reference to the detailed description of preferred embodiments when considered in conjunction with the drawings which form a portion of the disclosure and wherein:

FIG. 6 shows a chart of typical asphalt PG standards.

DETAILED DESCRIPTION

Figure 1:
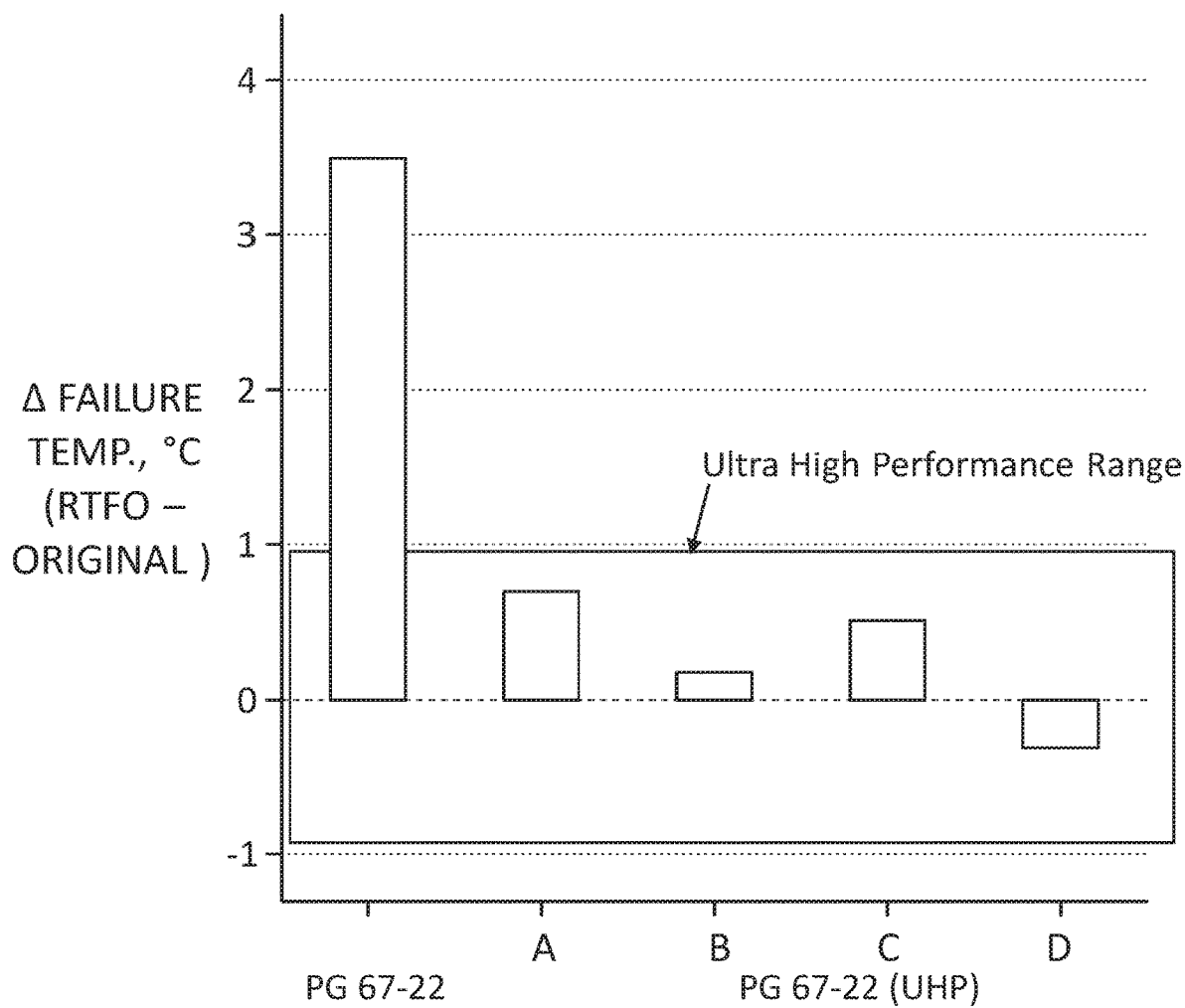
FIG. 1 is a bar graph comparing the A Failure Temperature (° C.) of a prior art PG 67-22 asphalt with four samples of embodiments according to the present invention.

The following detailed description is presented to enable any person skilled in the art to make and use the invention. For purposes of explanation, specific details are set forth to provide a thorough understanding of the present invention. However, it will be apparent to one skilled in the art that these specific details are not required to practice the invention. Descriptions of specific applications are provided only as representative examples. Various modifications to the preferred embodiments will be readily apparent to one skilled in the art, and the general principles defined herein may be applied to other embodiments and applications without departing from the scope of the invention. The present invention is not intended to be limited to the embodiments shown, but is to be accorded the widest possible scope consistent with the principles and features disclosed herein.

Improvement to long-term aging resistance of emulsified asphalt residue coatings is an area of direct need to improve methods of treating roadway substrates and surfaces, thereby increasing longevity and significantly reducing the life-cycle cost associated with pavement preservation treatments. This is accomplished in multiple steps—first, by selecting an asphalt composition with non-typical, highly age-resistant properties. Such an asphalt composition can be acquired using methods described in the '306 application or by any available alternative method. Requirements for selecting an asphalt composition suitable for practicing the invention are disclosed herein. Next, the chemicals used to disperse, suspend, stabilize, store, transport, and apply the emulsified asphalt in practice should be carefully selected by specifying and controlling the disclosed emulsified asphalt residue properties or by specifying new properties which link to (or predict) the disclosed properties. The properties and methods required to achieve age-resistant emulsified asphalt residue coating compositions will reveal to a person of skill in the art that he or she can successfully practice the claimed invention by selecting from a wide array of possible ingredients and proportions, as long as the properties of the cured emulsified asphalt residue coating are met. The disclosed invention provides an age-resistant emulsified asphalt residue coating composition and methods of treating roadway substrates with age-resistant coatings. The compositions and methods yield highly age-resistant emulsified asphalt residue coatings that lead to longer lasting emulsified asphalt surface treatments, including, but not limited to, fog seals, chip seals, slurry seals, micro-surfacing, and others.

The invention provides many useful embodiments for improving premature (short-term) and long-term durability in a variety of emulsified asphalt-containing compositions, forms, and products. In some embodiments, the invention provides compositions and methods for creating an emulsified asphalt residue composition that resists aging effects (referred to herein as "aging resistant emulsified asphalt composition") that meets or exceeds the premier modern-day standards for surface treatments, and, in addition, provides exceptionally high resistance to short-term and long-term aging-related surface treatment failures.

In one aspect, the method of the invention comprises the application of an aging resistant emulsified asphalt composition, or equivalent as discussed herein, to a substrate to provide a coating for a roadway with improved resistance to short-term and long-term aging caused by factors including volatilization, oxidation, polymerization, thixotropy, syneresis, and separation relative to a variety of exposure factors including air, temperature, UV radiation, and water. The emulsified asphalt of the present invention typically includes a first phase of aging resistant asphalt composition comprising about 30% to about 70% aging resistant asphalt composition based on the total weight of the emulsion. It should be understood that different treatment products will use different ranges within this broader range; for example, a fog seal has about 30% asphalt and a chip seal emulsion has about 68% asphalt. The aging resistant asphalt composition is an asphalt composition having a colloidal index (CI) within the range of about 2.5 to about 8.0 (preferably between about 2.8 and 8.0 and most preferably between about 3.7 and 8.0) and a measured change in BBR failure temperature between an RTFO plus 20-hour PAV-aged residue sample of the modified asphalt composition and an RTFO plus 40-hour PAV-aged residue sample of the aging resistant asphalt composition is less than about 3.5° C.

As used herein, CI is determined by the following equation:

$$CI = ((NA+PA)/(S+A))$$

where NA is naphthene aromatics, PA is polar aromatics, S is saturates, and A is asphaltenes.

In some embodiments, the aging resistant asphalt composition comprises, in total, about 40% to about 60% (preferably about 42% to about 55%) by weight naphthene aromatics, about 25% to about 45% (preferably about 30% to about 42%) by weight polar aromatics, about 1% to about 10% by weight saturates (preferably about 3% to about 8%), and about 3% to about 15% (preferably about 3% to about 12%) by weight asphaltenes. In some embodiments, the aging resistant asphalt composition further comprises a CI of between about 3.7 and about 8.0 (preferably between about 4.0 and about 8.0).

In some embodiments, the aging resistant asphalt composition has a low paraffin wax content of less than about 1.5% by weight according to EN 12606 (2015).

The aging resistant asphalt composition would also preferably have a measured difference between a high-temperature PG grade failure temperature from an original sample (i.e., a sample of non-aged or not aged by aging simulation methods) of the aging resistant asphalt composition and a high-temperature PG grade failure temperature from an RTFO-aged residue sample of the aging resistant asphalt composition of less than about 1.5° C. Additionally, the aging resistant asphalt composition would also preferably have a measured ΔTc of an RTFO plus 40-hour PAV-aged residue sample of the aging resistant asphalt composition greater than about −3.5° C.

In another aspect, the aging resistant asphalt composition would have a measured ΔTc of an RTFO plus 60-hour PAV-aged residue sample of the asphalt composition greater than about −6.0° C. The aging resistant asphalt composition would also preferably have a measured change in BBR failure temperature between an RTFO plus 20-hour PAV-aged residue sample of the aging resistant asphalt composition and an RTFO plus 60-hour PAV-aged residue sample of the aging resistant asphalt composition of less than about 8.0° C.

In yet another aspect, the aging resistant asphalt composition would have a measured Δ Failure Temp, ° C. (G*(sin δ)) between an RTFO plus 20-hour PAV-aged residue sample of the aging resistant asphalt composition and an RTFO plus 40-hour PAV-aged residue sample of the aging resistant asphalt composition of less than about 2.0° C. The aging resistant asphalt composition would also preferably have a measured Δ Failure Temp, ° C. (G*(sin δ)) between an RTFO plus 20-hour PAV-aged residue sample of the aging resistant asphalt composition and an RTFO plus 60-hour PAV-aged residue sample of the aging resistant asphalt composition of less than about 4.5° C.

In additional preferred embodiments, the aging resistant asphalt composition contains a measured G-R parameter value of less than 500.0 kPa at 15° C. and 0.005 rad/s of an RTFO plus 60-hour PAV-aged residue sample of the aging resistant asphalt composition.

In another aspect, the aging resistant asphalt composition contains a measured G-R parameter value of less than 350.0 kPa at 15° C. and 0.005 rad/s of an RTFO plus 40-hour PAV-aged residue sample of the aging resistant asphalt composition.

In yet another aspect, the aging resistant asphalt composition contains a crossover temperature of less than 32° C. calculated from the parameters of a master curve developed with G-R frequency sweep test data at 15° C. reference temperature of an RTFO plus 60-hour PAV-aged residue sample of the aging resistant asphalt composition.

In additional preferred embodiments, the aging resistant asphalt composition contains crossover temperature of less than 30° C. calculated from the parameters of a master curve developed with G-R frequency sweep test data at 15° C. reference temperature of an RTFO plus 40-hour PAV-aged residue sample of the aging resistant asphalt composition.

In another aspect, a measured change in the naphthene aromatics fraction of a non-aged (original) sample of the aging resistant asphalt composition and an RTFO plus 60-hour PAV-aged residue sample of the aging resistant asphalt composition is less than about 45 percent. Additionally, a measured change in the polar aromatics (resins) fraction of a non-aged (original) sample of the aging resistant asphalt composition and an RTFO plus 60-hour PAV-aged residue sample of the aging resistant asphalt composition is less than about 100 percent.

In yet another aspect, a measured change in the asphaltenes fraction of a non-aged (original) sample of the modified asphalt composition and an RTFO plus 60-hour PAV-aged residue sample of the modified asphalt composition is less than about 25 percent. Additionally, a measured change in the colloidal index (CI) of a non-aged (original) sample of the modified asphalt composition and an RTFO plus 60-hour PAV-aged residue sample of the modified asphalt composition is less than about 25 percent.

The emulsions of the present invention comprise a second aqueous phase which provides about 30% to about 70% of the total emulsion weight, and this second phase also may include emulsifier(s), and/or stabilizer(s), and/or other additive(s), in the amounts of about 0.1% to about 5% of the total weight of emulsion. The emulsions of the present invention may comprise at least the second aqueous phase that includes an emulsifier. The emulsions of the present invention optionally may further comprise stabilizing additives and additives providing an anionic, cationic, or neutral (non-ionic) character to the final emulsion. The proper emulsifier package may be selected from numerous chemical manufacturers supplying hundreds of pre-existing and newly developed emulsifier offerings each year designed for specific emulsion functions, i.e., rapid set (RS), quick set (QS), and slow set (SS) emulsions. Cationic emulsifiers are often derived from tallow amine, oleic acid, and other sources and reacted with hydrochloric, phosphoric, or other acid to create an emulsifying solution. Anionic emulsifiers are commonly derived from tall oil, tall oil resins, lignosulphonate, and other sources and reacted with sodium or potassium hydroxide or other catalysts. Non-ionic (neutral) emulsifiers are less common in the asphalt emulsion industry. Most emulsifiers commonly contain one or more of the following components or by-products through various reactions: tallow diamine, tallow diquaternary, ethoxylates, oleic acid, soy, quaternary ammonium salts, ammonia, alkoxylates, carboxylate, sulfonates, triglycerides, modified diamine, fatty amines, fatty acids, linear fatty acids, rosin acids, nonylphenyl, tall oil acid, tall oil imidazoline, lignin, ligninamines, imidazolines, and amidoamines. The emulsifier chemical makeup, activity level, loading rate, and compatibility with other emulsion components and asphalts, among other factors, will impact the properties of the emulsified asphalt residue coating. A person of skill in the art will be familiar with the process of selecting an emulsifier for a stated end-use purpose, which may involve consulting with chemists and/or chemical engineers employed by the chemical companies supplying the emulsifiers. The chemical and physical properties of the aging resistant asphalt composition providing the first aging resistant asphalt composition phase, and the emulsifiers and optional stabilizers/additives so that the asphalt composition may be combined with the secondary water phase at temperatures and under mixing and milling conditions that produce a successful, stable emulsion and, subsequently, a successful, age-resistant coating as described herein after application to a substrate and curing.

In some embodiments, the aging resistant emulsified asphalt comprises an emulsifier or emulsifying agent that is substantially devoid of free hydroxide anions ($OH^-$), or intramolecular hydrogen bonds, or intermolecular hydrogen bonds associated with a hydroxyl group (—OH - - - H)

according to FTIR spectroscopy (ASTM E1252-98(2013) e1). In other preferred embodiments, chemical composition of the emulsifier determined by the FTIR spectroscopy (ASTM E1252-98(2013)e1) is substantially devoid of intermolecular hydrogen bond associated with a primary amine (—$NH_2$), or a secondary amine (—NH), or an amide (R—CO—NH2). Further, in certain aspects, the emulsifier composition is substantially devoid of unsaturated nitrogen associated with a carbon atom or an alkyl group or an aryl group or as a cyclic compound (cyclic amine). In most preferred embodiments, the emulsifier is substantially devoid of unsaturated carbon in the form of ketone or carboxylic acid or dicarboxylic anhydrides. In some preferred embodiments, the emulsifier is substantially devoid of ester groups in the form of formates or acetates or benzoates. In some preferred embodiments, the emulsifier may contain a polymer group such as styrene-butadiene-styrene (SBS).

In another aspect, a method is provided for applying the aging resistant emulsified asphalt to a pavement to form a layer and curing the applied emulsified asphalt layer. Curing is generally considered complete when 90% by weight of water and/or volatile components in the applied emulsion have evaporated, leaving a coating of the emulsified asphalt residue on the pavement surface. The emulsified asphalt residue generally contains at least an aging resistant asphalt composition and an emulsifier as described herein and also has a measured change in BBR failure temperature between an RTFO plus 20-hour PAV-aged residue sample of the emulsified asphalt residue composition and an RTFO plus 40-hour PAV-aged residue sample of the emulsified asphalt residue composition of less than about 3.5° C. The emulsified asphalt residue composition would also preferably have a measured difference between a high-temperature PG grade failure temperature from an original sample of the emulsified asphalt residue composition and a high-temperature PG grade failure temperature from an RTFO-aged residue sample of the emulsified asphalt residue composition of less than about 1.5° C.

In another aspect, the aging resistant emulsified asphalt is applied to a substrate and, after curing or having the water and/or volatile components removed, the remaining emulsified asphalt residue composition has a colloidal index within the range of about 2.5 to about 8.0 (preferably between about 2.8 and 8.0) and additionally, the emulsified asphalt residue composition would also preferably have a measured $\Delta Tc$ of an RTFO plus 40-hour PAV-aged residue sample of the emulsified asphalt residue composition greater than about −3.5° C.

In another aspect, the aging resistant emulsified asphalt is applied to a substrate and, after curing or having the water and/or volatile components removed, the remaining emulsified asphalt residue composition has a measured $\Delta Tc$ of an RTFO plus 60-hour PAV-aged residue sample of the emulsified asphalt residue composition greater than about −5.0° C. The emulsified asphalt residue composition would also preferably have a measured change in BBR failure temperature between an RTFO plus 20-hour PAV-aged residue sample of the emulsified asphalt residue composition and an RTFO plus 60-hour PAV-aged residue sample of the emulsified asphalt residue composition of less than about 5.5° C.

In yet another aspect, the aging resistant emulsified asphalt is applied to a substrate and, after curing or having the water and/or volatile components removed, the remaining emulsified asphalt residue composition has a measured $\Delta$ Failure Temp, ° C. ($G^*(\sin \delta)$) between an RTFO plus 20-hour PAV-aged residue sample of the emulsified asphalt residue composition and an RTFO plus 40-hour PAV-aged residue sample of the emulsified asphalt residue composition of less than about 2.0° C. The emulsified asphalt residue composition would also preferably have a measured $\Delta$ Failure Temp, ° C. ($G^*(\sin \delta)$) between an RTFO plus 20-hour PAV-aged residue sample of the emulsified asphalt residue composition and an RTFO plus 60-hour PAV-aged residue sample of the emulsified asphalt residue composition of less than about 4.5° C.

The aging resistant emulsified asphalt composition can then be used as a direct replacement in known emulsified asphalt surface treatment applications, including, but not limited to, fog seals, chip seal emulsions, scrub seals, slurry seals, and microsurfacing. The aging resistant emulsified asphalt composition may be spray-applied, broomed, painted, brushed, scrubbed, or squeegee-applied at a rate ranging from about 0.01 gal/sy (0.05 L/m$^2$) to about 0.60 gal/sy (2.72 L/m$^2$). The application varies considerably depending on the application. For example, when formulated for a fog seal emulsion application, such as SS-1H or CSS-1H, the aging resistant emulsified asphalt composition can typically be applied at 0.03 gal/sy (0.14 L/m$^2$) to about 0.20 gal/sy (0.91 L/m$^2$). Whereas, when formulated for a chip seal emulsion application, such as CRS-2 or CRS-2P, the aging resistant emulsified asphalt composition can typically be applied at about 0.35 gal/sy (1.58 L/m$^2$) to about 0.50 gal/sy (2.26 L/m$^2$).

The aging resistant emulsified asphalt composition may then be mixed, combined, or covered with crushed rock/stone, gravel, granite, limestone, crushed concrete, crushed brick, reclaimed asphalt pavement (RAP), reclaimed asphalt shingles (RAS), soil, slag, sand, mineral filler, and other aggregates. In this way, the aging resistant emulsified asphalt composition can be used to create preservation treatments, surface treatments, recycling treatments, patching material. The aging resistant emulsified asphalt composition can additionally be used for other treatments including but not limited to seal coats, chip seals, scrub seals/rejuvenating scrub seals. A scrub seal refers to an emulsion that is scrubbed into the surface to fill cracks and voids to create an impermeable surface coating. It may contain aggregate mixed into the emulsion; may or may not contain a rejuvenating agent. The aging resistant emulsified asphalt composition can also be used for slurry seals, (which are textured wearing surfaces formed from an emulsion combined with about 75% to about 92% aggregate and applied to the surface using a spreader box), micro surfacing, cape seals (which is a combination of two treatments—slurry seal over chip seal); and sand seals (formed from sand applied directly on top of an emulsified asphalt layer to create a surface with better skid resistance than can be achieved with a lone emulsion application on the surface). The resulting aging resistant emulsified asphalt residue coating that remains in place after water and volatiles are removed in the curing process, range in by weight percentage from about 30% to about 70% of the asphalt emulsion.

It is well-known that asphalts used in asphalt emulsions typically undergo less rigorous testing than asphalts graded for non-aqueous applications and AC pavement applications. These asphalts are often considered to be inferior to paving (mixing) PG-grade asphalts. Generally, emulsified asphalt residue coatings also undergo very limited performance testing. Due to the nominal performance testing of the emulsified asphalt residue coatings used in the above-listed applications, age-resistance of the emulsified asphalt residue coating can be a particularly important issue for the longevity of those applications. Thus, the aging-resistance properties imparted to the substrate and roadway surface by the coating or treatment of the present invention will result in fewer of the above-listed emulsion applications used as in-lifetime treatments.

Aging Resistant Emulsified Asphalt Composition Formulation:

The aging resistant emulsified asphalt composition can comprise by weight at least: aging resistant asphalt composition as an "oil phase" (30% to 70%) and an aqueous phase (70% to 30%), including emulsifier(s) and optional thickeners, pH adjusters, modifiers, and other typical asphalt and emulsion additives, such as water softeners, adhesion promoters, breaking agents, peptizers, polymers, among other additives well-known in the art. Typically, the emulsifiers make up about 0.05% to about 5% by weight of the aging resistant emulsified asphalt composition. Emulsifiers suitable for use in aging resistant emulsified asphalt compositions include cationic, anionic, and nonionic emulsifiers, so long as the claimed properties of the residue are met. A person of skill in the art can determine which type and amount of an emulsifier or emulsifiers is/are needed for a desired application of the aging resistant emulsified asphalt composition.

The resulting aging resistant emulsified asphalt residue coating, the residue of the aging resistant emulsified asphalt composition that remains in place after water and volatiles are removed in the curing process, range from 30% to 70% of the asphalt emulsion (by weight percentage). The aging resistant emulsified asphalt composition may be used independently or as part of a system that involves mixing or additional blending with other components, such as aggregates, as is customary for some emulsified asphalt treatment products. The aging resistant emulsified asphalt composition may contain additional non-aqueous solvent, and in some embodiments, may have sufficient non-aqueous additional solvent to form an aging resistant asphalt cutback emulsion composition.

Emulsified asphalt compositions and methods of preparing them are well-known in the field, and any known mixing method and/or equipment (e.g., colloid mill) can be used to prepare the aging resistant emulsified asphalt composition. Typically, molten aging resistant asphalt composition (>280° F./138° C.) is introduced along with water, emulsifier(s), and other optional additives in solution ("soap") under pressure into a high-shear colloid mill. The type and quantity of emulsifiers and additives used will vary based on the emulsion application but should be selected in accordance with providing a stable emulsion and an age-resistant emulsified asphalt residue coating. The colloid mill produces tiny, dispersed droplets of asphalt with mean diameter of typically less than about 0.025 mm (25 microns).

The resulting aging resistant emulsified asphalt composition will have a variable storage life of weeks to months depending on the specific type of emulsion and its components. During this period, the emulsion can be re-agitated periodically using a ribbon blender or other suitable method to maintain a homogeneous dispersion of emulsified asphalt droplets. Aging resistant emulsified asphalt composition can then be mixed or combined with aggregates for some applications. Optionally, the aggregates may be heated prior to mixing, which may be advantageous for removing any residual water that could be held by the aggregate material. Depending on the application and emulsified asphalt product, different types and sizes of aggregate material will be selected by a person of skill in the art, especially for those emulsified formulations that follow.

Conventional Asphalt and Emulsified Asphalt Additives:
Softeners, including, but not limited to, flux, re-refined engine oil bottom (REOB), anti-strip agents, warm mix additives, vacuum tower asphalt extender (VTAE), petroleum extract, solvents, or other known "cutters" to achieve a lower PG grade, make a less viscous product, improve lubricity in a mixture, and/or reduce temperature requirements. Hardeners, plastomers, and elastomers, including, but not limited to, ethylene vinyl acetate (EVA), vinyl acetate-ethylene (VAE), styrene-butadiene-styrene (SBS), styrene butadiene (SB), styrene-butadiene rubber (SBR), SBR Latex, polychloroprene, isoprene, polybutadiene, acrylic, acrylic copolymers, ground tire rubber (GTR), crumb rubber modifier (CRM), terpolymers, polyphosphoric acid (PPA), natural or synthetic waxes, GILSONITE (also known as uintaite), Trinidad Lake asphalt, and other modifiers that are well-known in the industry and commonly used for the purpose of adding elastomeric properties, strength, and/or "grade-bumping" for asphalt compositions, and any combination of the foregoing. Emulsion additives, including, but not limited to, stabilizers, thickeners, additives known to adjust pH, water softeners, breaking agents, peptizers, and adhesion promoters may also be employed, as wanted or necessary. As noted above, these optional components are referred to as conventional asphalt and emulsified asphalt additives. Conventional asphalt and emulsified asphalt additives are optional components of the invention. One or more conventional asphalt additives may be needed to enhance performance and/or meet the final product requirements set by a government transportation agency or other entity contracting for a pavement job or a pavement maintenance job. The amount of conventional asphalt additive(s) used may be any amount that is typically used for modifying asphalts for a given application and/or asphalt product. These amounts are well-known in the field. Thus, a person of skill in the art would be able to determine what conventional asphalt additive(s) and what amount(s) is/are desirable or required to meet a given application condition or contract requirement for the emulsified asphalt composition. This optional component is available within the constraints of the minimum testing criteria and properties described herein for the aging resistant emulsified asphalt residue coating compositions and methods.

Aging Resistant Emulsified Asphalt Surface Treatment Compositions and Formulations It has been demonstrated that surface-initiated failures due to age-hardening in asphalt surfaces and asphalt coatings are most prevalent in the top few millimeters of the surface. For this reason, the methods of achieving aging resistant emulsified asphalt surface treatments are focused on applications which are applied to a substrate and remain exposed to natural environmental elements near the roadway surface. These various conventional treatments that are improved by the present disclosure compositions and methods are commonly referred to as surface treatments or preservation treatments. This category includes but is not limited to fog seals, sand seals, seal coats, chip seals, slurry seals, and microsurfacing. These formulations and processes are described in more detail below.

Aging Resistant Emulsified Asphalt Fog Seal Formulation:

An aging resistant emulsified asphalt fog seal can comprise by weight about 100% aging resistant emulsified asphalt composition (including any optional conventional additives). It is typically applied onto a substrate at 0.03 gal/sy (0.14 L/m$^2$) to about 0.20 gal/sy (0.91 L/m$^2$). Once the water and other volatile components evaporate from the aging resistant emulsified asphalt fog seal (curing), an emulsified asphalt residue coating remains on the roadway surface exposed to the environmental elements. The final treatment typically contains a thickness of less than about 1 mm.

Aging Resistant Emulsified Asphalt Sand Seal Formulation:

An aging resistant emulsified asphalt sand seal can comprise by weight about 10% to about 70% aging resistant emulsified asphalt composition (including any optional conventional additives) and sand (about 90% to about 30% by weight). The process for creating an emulsified asphalt sand seal involves applying aging resistant emulsified asphalt fog seal composition (including optional conventional additives) onto a substrate at a rate of about 0.10 gal/sy (0.14 L/m$^2$) to about 0.25 gal/sy (0.91 L/m$^2$). Sand is then applied directly on top of the aging resistant emulsified asphalt fog seal at a typical rate of about 18 lbs/sy to about 25 lbs/sy using a distributor truck; however, the amount of sand that is applied can vary significantly depending on the desired friction characteristics of the riding surface. Once the water and other volatile components evaporate from the aging resistant emulsified asphalt fog seal (curing), any excess sand is broomed away or otherwise removed. An emulsified asphalt residue coating plus sand remains on the roadway surface exposed to the environmental elements. The final treatment contains a typical thickness of less than about 5 mm.

Aging Resistant Emulsified Asphalt Seal Coat Formulations:

An aging resistant emulsified asphalt seal coat formulation can comprise by weight about 30% to about 70% aging resistant emulsified asphalt composition (including any optional conventional additives) and aggregates (about 70% to about 30%). The aging resistant emulsified asphalt composition is typically pre-mixed or combined with crushed rock/stone, gravel, granite, limestone, crushed concrete, crushed brick, RAP, RAS, soil, slag, sand, mineral filler, other small aggregates, or any combination of these to create an aging resistant emulsified asphalt seal coat composition. The aging resistant emulsified asphalt seal coat composition (including any optional conventional additives) is then applied onto a substrate at a typical rate of about 0.10 gal/sy (0.45 L/m$^2$) to about 0.25 gal/sy (1.13 L/m$^2$). An emulsified seal coat asphalt residue coating plus aggregates remain on the roadway surface exposed to the environmental elements. The final treatment contains a typical thickness of less than about 5 mm.

Aging Resistant Emulsified Asphalt Chip Seal Formulation:

An aging resistant emulsified asphalt chip seal formula can comprise by weight at least: about 0.5% to about 25% aging resistant emulsified asphalt composition (including any optional conventional additives) and aggregates (about 99.5% to about 75%). The aging resistant emulsified asphalt composition (combined with any optional conventional asphalt additives) is heated and sprayed directly onto a substrate, such as an aggregate base, sub-base, or existing roadway, and in a subsequent step, aggregate "chips", such as crushed rock/stone, gravel, granite, limestone, crushed concrete, crushed brick, soil, slag, sand, RAP, and RAS, etc. or combinations thereof are applied directly on top of the aging resistant emulsified asphalt composition to create an aging resistant emulsified asphalt chip seal. The aggregate chips are sometimes pre-coated with an asphalt composition, although this is not always a requirement. In such case, it is preferred that such coating is made with an appropriate aging resistant emulsified asphalt composition or non-emulsified aging resistant asphalt composition as taught in the '306 application.

After the aging resistant asphalt composition is sprayed, the pre-coated or non-pre-coated aggregates are dropped onto a relatively thick film of aging resistant emulsified asphalt composition. Shortly after compaction rolling, the chip-covered surface is ready for traffic. The volume of aging resistant emulsified asphalt composition that is sprayed to hold the chips in place can vary from about 0.20 gal/sy to about 0.50 gal/sy and is determined based on the volume of aggregate cover in the design. The amount of aging resistant emulsified asphalt composition should be sufficient to provide 20% to 60% embedment (more typically 30% to 40%) of the seated aggregate chips. Multiple consecutive layers may be applied on top of one another. These processes and designs are well known to a person of skill in the art and are presented in greater detail in manuals such as the *Seal Coat and Surface Treatment Manual* (Revision May 2010), Texas Department of Transportation, which is incorporated by reference in its entirety to the extent that it is not contradictory with the present disclosure. The final aging resistant emulsified asphalt chip seal composition can range in thickness from between about ⅜ inch (9.5 mm) to about 2 inches (50 mm).

As previously mentioned, the aging resistant emulsified asphalt composition used to create an aging resistant emulsified asphalt chip seal may be spray-applied, broomed, painted, brushed, scrubbed, or squeegee-applied. The composition may also be combined with a "rejuvenator." These additional processes often alter the description for the treatment in practice, but not the basic principles underlying the treatment and as described herein. For example, a chip seal emulsion that is "broomed" or "scrubbed" into the surface to more effectively fill voids and cracks prior to placing chips over the emulsified asphalt to create a "chip seal," is often referred to as a "scrub seal" rather than a "chip seal." Similarly, a "scrub seal," as just described, that is combined with a rejuvenator may be referred to as a "rejuvenating scrub seal." The latter is essentially still a chip seal, only with and an additional application step of brooming the emulsion and an additional conventional asphalt additive "rejuvenator" included. In any case, an aging resistant emulsified asphalt residue coating plus aggregates remains near the roadway surface exposed to the environmental elements.

Aging Resistant Emulsified Asphalt Slurry Seal Formulation:

An aging resistant emulsified asphalt slurry seal formulation can comprise by weight about 8% to about 25% aging resistant emulsified asphalt composition (including any optional conventional additives) and aggregates (about 92% to about 75%). The aging resistant emulsified asphalt slurry seal composition is typically pre-mixed or combined with crushed rock/stone, gravel, granite, limestone, crushed concrete, crushed brick, RAP, RAS, soil, slag, sand, mineral filler, other aggregates, or any combination of these to create an aging resistant emulsified asphalt slurry seal composition. Shortly after mixing with aggregates, the aging resistant emulsified asphalt slurry seal composition (including any optional conventional additives) is then applied onto a substrate using a special slurry truck equipped with a spreader box to achieve a typical application rate that yields a final textured thickness of about ⅛-inch (3 mm) to about ⅜-inch (9.5 mm). The application rate is based on the largest aggregate or nominal maximum aggregate contained in the slurry mixture—Types I, II, or III—which are well-known in the art. The application may include breaking agents to aide in the breaking and curing process of the treatment. An aging resistant emulsified asphalt residue coating plus aggregates remains on the roadway surface exposed to the environmental elements.

Aging Resistant Emulsified Asphalt Microsurfacing Formulation:

An aging resistant emulsified asphalt microsurfacing formulation generally closely matches that of the aging resistant emulsified asphalt slurry seal formulation. The formulation can comprise by weight about 8% to about 25% aging resistant emulsified asphalt composition (including any optional conventional additives) and aggregates (about 92% to about 75%). The aging resistant emulsified asphalt microsurfacing composition is typically pre-mixed or combined with crushed rock/stone, gravel, granite, limestone, crushed concrete, crushed brick, RAP, RAS, soil, slag, sand, mineral filler, other aggregates, or any combination of these to create an aging resistant emulsified asphalt slurry seal composition. Shortly after mixing with aggregates, the aging resistant emulsified asphalt microsurfacing composition (including any optional conventional additives) is then applied onto a substrate using a special slurry truck equipped with a spreader box to achieve a typical rate which yields a final textured thickness of about ⅜-inch (9.5 mm) to about 0.6-inch (15.2 mm). The application rate and final thickness is typically slightly greater than that of a slurry seal.

The aging resistant emulsified asphalt microsurfacing composition can be considered a higher performance version of a slurry seal. As compared to a slurry seal, specifications for microsurfacing compositions typically require a polymer additive, a thicker coating layer, tighter restrictions on the percentage of clay/plastic fines/dust-type particles allowed in the mixture, and typically require a breaking agent, such as cement, limestone, limestone dust, or fly-ash, for faster curing. As mentioned above, the application may include breaking agents to aide in the breaking and curing process of the treatment. An aging resistant emulsified asphalt residue coating plus aggregates remains on the roadway surface exposed to the environmental elements.

Aging Resistant Emulsified Asphalt Cape Seal Formulation:

An aging resistant emulsified asphalt cape seal formulation combines the two treatments previously described—aging resistant emulsified asphalt slurry seal applied directly on top of aging resistant emulsified asphalt chip seal. The formulas and processes are the same; only combined sequentially.

These treatments and methods of preparing the conventional forms of them are well-known in the field and any known mixing method and/or equipment can be used to prepare the aging resistant emulsified asphalt surface treatments. Depending on the specific application and surface treatment composition, different types and sizes of aggregate material may be selected by a person of skill in the art.

In order to better understand the innovation and utility of the inventive compositions and methods disclosed herein, a brief discussion of asphalt testing, specifications, common failures, and approaches to solving them is presented. Subsequently, related sections specific to emulsified asphalt will follow. Surface-initiated distress cracks and delamination in surface treatments (induced by aging) and methods to reduce them is the focus of the present disclosure. A more thorough discussion of this and other aspects related to the disclosed compositions and methods is presented below.

Typical Specifications and Performance Testing—Asphalt Versus Emulsified Asphalt Residue The primary purpose of this section and those that follow is to distinguish the typical quality of asphalt used in practice today as it relates to the terms "asphalts used in non-aqueous applications," "asphalts used in emulsions," (both are types of "asphalt") and "emulsified asphalt residue." It is first important to make the distinction between asphalt and emulsified asphalt residue relative to an emulsified asphalt. Asphalt is an ingredient used to make an asphalt emulsion (i.e., the emulsified asphalt). Emulsified asphalt residue, on the other hand, is the residue left behind after an emulsified asphalt has been applied to a substrate and complete curing of the emulsified asphalt has occurred.

Emulsions are commonly considered to have reached a sufficient level of curing when about 90% water by weight of the emulsion has evaporated. Any remaining water and volatiles continue to be expelled via standard evaporation and diffusion through a thin layer of emulsion "skin" over a period of hours to days. Heat, humidity, and other variables can have a significant impact on the timeline for complete curing. Certain emulsion treatments may permit traffic prior to complete curing, particularly if the treatment includes cover aggregates as a riding surface. Properties of the emulsified asphalt residue after "complete curing" can be obtained in the laboratory via the distillation method of extracting emulsion residue (ASTM D6997-12 or ASTM D7403). The remaining emulsified asphalt residue contains various chemicals and additives that were used to disperse, suspend, stabilize, and apply the emulsion, as well as any additional conventional asphalt and emulsion additives. Historically and presently, there is very little control over the quality of asphalts used to produce emulsified asphalts (asphalts used in emulsions). Additionally, chemical emulsifiers and additives used to create emulsified asphalts can alter the age susceptibility of the emulsified asphalt residue, thus further reducing its quality as a coating or glue used for surface treatments. Age susceptibility of the asphalt residue typically goes unchecked.

In contrast, asphalts used in mixtures to build roadways (asphalts used in non-aqueous applications) undergo various testing requirements and are held to a much higher standard than an emulsified asphalt residue. Therefore, asphalts used for non-aqueous applications are typically higher quality than those used in emulsified asphalt (aqueous applications). Even though asphalts used for non-aqueous applications are typically of higher quality, even these asphalts are extremely flawed and typically fall below the standards for "age resistant asphalt composition," which is a constituent requirement to practice this invention (see '306 application). It is true that asphalt as a material composition has many limitations itself, but these limitations do not compare to the magnitude of limitations that are common to emulsified asphalt residue.

Asphalt Performance Testing

Laboratory-based performance tests are heavily relied upon by civil engineers and other persons of skill in the art to predict the behavior and performance of asphalt initially at the time of application and during a fraction of its projected and intended lifespan. The testing of asphalt has advanced over time with improvements in equipment, understanding, and methodology, but shortcomings still exist in the field. Currently, the premier asphalt specification and grading system in the world is the American Association of State Highway and Transportation Officials ("AASHTO") M320-16, Standard Specification for Performance-Graded Asphalt Binder. It is the asphalt portion of the Superior Performing Asphalt Pavement (SUPERPAVE) System, introduced in 1993, which also includes methods that are specific to aggregates and the asphalt concrete ("AC") pavement/mixture. To an extent that is practical, the modern-day AASHTO M320-16 specification system attempts to predict and measure potential detrimental performance of asphalt caused by flawed chemical make-up, volatilization, and oxidative aging using a variety of laboratory equipment and methods (often in unison). Commonly used testing equipment includes the RTFO, PAV, ductilometer, viscometer, dynamic shear rheometer ("DSR"), and bending beam rheometer ("BBR"), among others.

The AASHTO M320-16-approved laboratory aging simulators (RTFO and the 20-hr PAV) are designed to simulate volatilization and oxidative aging of an asphalt that has been in service for about 3-10 years. The RTFO test simulates aging that occurs from volatilization (primary) and oxidation (secondary) during mixing and asphalt placement. The PAV test (performed on a sample that has first undergone the RTFO procedure) simulates long-term aging of the sample after placement (in-service aging). Although there is debate about how many years are simulated by the complete PAV procedure, approximately 7 years or less is commonly assumed in the field. After the aging simulations are performed, asphalts are tested for susceptibility to distresses which are linked to age-hardening. The AASHTO M320-16 system considers general conditions that are most critical for the 3 major distresses—(1) bottom-up fatigue cracking, (2) plastic deformation (rutting), and (3) surface-induced cracking. For example, rutting is most likely to occur in a non-aged (relatively new) asphalt at high ambient temperatures relative to the asphalt grade. Conversely, surface-induced cracking is most likely to occur in an aged asphalt at low ambient temperatures relative to the asphalt grade. The system accounts for regional high and low temperature extremes, and government transportation agencies typically specify that asphalts must meet minimum and maximum criteria at the temperatures that are common to that region. These criteria/requirements are specified in a contract(s) for a given paving job. AASHTO M320-16 uses the term Performance Grading (PG) to define the asphalt grade that is allowed for use in an AC mixture. For example, a PG 67-22 grade requirement means that an asphalt will be exposed to a maximum regional temperature of 67° C. (152.6° F.) and a minimum regional temperature of −22° C. (−7.6° F.). In this case, test criteria for rutting susceptibility must be met at 67° C. for non-aged and RTFO-aged asphalt, and test criteria for low-temperature cracking susceptibility must be met at −22° C. for RTFO+PAV-aged asphalt (simulating approximately 7 years of aging). Commonly reported results include flash point, viscosity, G*/sin δ, mass loss %, G*(sin δ), S(t), m-value, and ductility—each obtained at a designated temperature and aging condition. FIG. 6 shows a chart of typical asphalt PG standards.

The mere adoption of AASHTO M320-16 has led to greatly improved asphalt performance at every turn. In fact, this is the first specification system to truly consider the fact that asphalt properties change significantly over time due to the aging process. The primary variable that is holding the system back from ensuring much higher levels of performance is the inherent age-susceptibility of virtually all asphalts. Although AASHTO M320-16 considers age-hardening that occurs over a 7-year period (by the RTFO+PAV aging simulation), AC pavements are typically designed structurally to last at least 20 years. This expected 20-year structural lifespan was largely validated in a thorough field study by Von Quintus et al. (2005) *APA: Expected Service Life and Performance Characteristics of HMA Pavements in LTTP*. Applied Research Associates, ERES Consultants Division, Round Rock, Tex. Even with the superior asphalt grading system that is in place today, the age-susceptible nature of asphalt largely prevents laboratory predictability and control of long-term asphalt performance.

Age-Sensitivity and Variability Among Asphalts

Although not all reported test parameters have the same predictive power or correlation to measured distress in aged pavements, many different values can be used to demonstrate change in asphalt properties induced by age-hardening. Take for example the viscosity measurement, which has been used extensively in the past and presently to demonstrate age-hardening. Relative change in viscosity for six asphalts over an 80-month period (or nearly 7 years) was reported by Kandhal et al. (1973). *Shear Susceptibility of Asphalts in Relation to Pavements Performance*. Association of Asphalt Paving Technologists, Vol. 42, pp. 99-111. As presented by Kandhal et al., each asphalt was impacted very differently by volatilization, oxidation, and other aging factors. Nonetheless, a common trend for each asphalt was noted—a significant amount of age-hardening occurs during the mixing period and initially after being introduced into service (paving application/placement). Each asphalt then continues to age throughout the 7-year period at different rates. Based on viscosity measurements, the asphalt most impacted by aging in the Kandhal et al. study was Asphalt 1 (over 2,500% increase in viscosity over 7 years), and the asphalt least impacted by age-hardening was Asphalt 3 (still nearly 500% increase in viscosity over 7 years). What this data shows is that even a "good asphalt," such as Asphalt 3, changes so drastically in 7 years that it exhibits properties and behavior that are nothing like the original asphalt. Bear in mind, once again, that asphalt is designed to be in service for over 20 years; not 7 years. The viscosities for these six asphalts prior to mixing ranged from 900P to 2,800P (range of 1,900P). The viscosities for the six asphalts after 7 years in service ranged from 7,000P to 40,000P (range of 33,000P)!

This simple demonstration shows the potential for significant variability in performance for asphalts that were relatively similar in their pre-mixing state. It is clear that each asphalt ages differently, but what is the cause and what solutions have been offered to mitigate and control these effects? Although asphalt screening has improved since the 1970s with the modern-day AASHTO M320-16 specification system, even the most widely-approved asphalts today are extremely limited in their ability to resist long-term aging effects. How large is the variability in these asphalt properties at the 20-year mark? Will AC pavements constructed with currently-approved asphalts even last that long? With typical AC pavement construction warranties expiring after 3 years or less (in many cases, no warranties), what is the consequence if the pavements do not last for the entire 20-plus year design life? These questions are rarely given consideration due to the inherent limitations of today's "high-quality" asphalts that are routinely approved for use in the construction of roadways, parking lots, and airfields.

Asphalt Distress Types and Mechanisms

As a driving public, there is tendency to notice roadway distresses only once severe loss of ride quality is evident—encountering potholes for example. Distresses such as potholes are symptomatic of an AC pavement in an extremely advanced stage of deterioration. Long before an AC pavement reaches this end-of-life stage, well-trained civil engineers and persons of skill in the art should be fully aware of underlying failure modes that will eventually lead the pavement towards its end, whether it is a pothole or another failure mechanism. As mentioned above, these failure modes can basically be broken into three primary categories: (1) bottom-up fatigue cracking, (2) rutting, and (3) age-induced surface-initiated distress (cracking and raveling). Today, most newly and properly constructed AC pavements are adequately resistant to heavy load-initiated distresses (bottom-up fatigue cracking and rutting) throughout the intended lifespan, due mainly to advances in engineering design and contributions from polymer science. Resistance against these two traffic-induced distresses was built over time and came largely from efforts of earlier civil engineers and other persons of skill in the art who were tasked with designing against extraordinary traffic changes that were previously unprecedented in highway pavement design. The challenges faced by them included a nearly 1,300% increase in annual vehicle miles travelled (VMT) from 0.25 trillion in 1930 to 3.2 trillion in 2015, and a nearly 300% increase in maximum heavy truck load limits from 28,000 pounds in 1913 to the modern-day maximum of 80,000 pounds, per data available from the Federal Highway Administration and DOT.

The advancements in the former two failure modes seem to have come at the detriment of the latter failure mode: surface-initiated (age-related) distress. Surface-initiated distress is the cause of most premature failures of asphalt paved roadways during the last few decades. In fact, solutions to bottom-up fatigue cracking and rutting (increased stiffness or complex modulus) are the specific causes of surface-initiated distress in many cases. Mix-related rutting is primarily an issue early in the pavement life, and the risk decreases significantly as asphalt hardens over time. Early-life prevention of rutting is typically controlled today with increased asphalt stiffness by using RAP/RAS and/or conventional asphalt additives. Bottom-up fatigue cracking can also be controlled by using similar approaches, but unlike rutting, the risk of bottom-up fatigue cracking still exists in aged AC pavements. In many cases, bottom-up fatigue failures can be attributed to brittleness (caused by aging, especially oxidation) combined with loss of structural sub-base and base support from surface distress-induced water infiltration. This problem is frequently seen in thinner pavements. De-bonding is also another major contributor to bottom-up fatigue distress in aged asphalt. To summarize, surface-initiated distress is often a direct consequence, whether intentional or not, of combatting load-induced distresses with stiffness. Further, bottom-up fatigue cracking is likely to occur later in life, regardless, if interlayer bonding is not sufficient and if the sub-base is not stabilized to resist water infiltration permitted by surface-initiated distress.

Age-Induced Surface-Initiated Distress in Asphalt

The surface-initiated distress epidemic has been well-researched over the last few decades. Pavements throughout the world that are designed to last structurally for over 20 years routinely exhibit significant surface-initiated distress within 3-10 years and as early as 1 year after construction. In fact, it was found in Florida that over 90% of pavements that were due for rehabilitation had experienced substantial surface-initiated cracking. Myers et al. (1998) concluded that the surface-initiated cracking in Florida was not related to structural design but due to inferior fracture resistance of the asphalt—a result of asphalt aging. It is important to note that many of these locations, including Florida, require the AASHTO M320-16 specification, which is the premier system in the world to screen for asphalt quality. It can therefore be concluded that it is not just poor-quality asphalts in countries and locations with out-of-date specifications that are failing; asphalts that are the best asphalts in the world are failing due to surface-initiated distress.

It has been established that asphalt is the limiting factor for AC pavement lifespan. The growing implementation of safety-targeted open-graded friction course (OGFC) pavements is certain to cause even greater durability issues for age-susceptible asphalts. OGFC pavements are designed to rapidly drain water from the surface to prevent hydroplaning. To do so, these pavements are built with higher void structure, which permits higher air/water permeation, and thus higher oxidative aging rates.

Microstructural Investigation of Age-Sensitive Asphalts

With recent advances in atomic force microscopy (AFM), researchers have begun to identify the cause of premature cracking failures in some asphalts that is symptomatic of age-hardening effects. In many cases, these asphalts have not even experienced significant oxidative aging. It has been confirmed by that as asphalt ages, its topographical microstructure develops a well-defined pattern of bee structures. See, e.g., Allen, Microstructural Characterization of the Chemo-mechanical Behavior of Asphalt in Terms of Aging and Fatigue Performance Properties, *Doctoral Dissertation*, Texas A&M University (2013). These bee structures (striated occurrences) are believed to be associated with the onset of premature surface-related distress. Allen (2013) also found a bee structure pattern in asphalts that had not yet experienced extensive aging, where bee structuring occurred more often as the % of asphalt saturates chemical fraction increased.

These previous findings by Allen (2013), reveal that the formation of micro-scale topographical bee structuring in non-aged asphalts with high saturates content and aged asphalts, strongly corroborated the macro-scale-based theory suggested earlier by Lin et al. (1996). See, Lin et al. *The Effect of Asphalt Composition on the Formation of Asphaltenes and Their Contribution to Asphalt Viscosity*, Fuel Sci. and Technol. Int'l, 14(1&2), 139-162 (1996). According to that theory, an improper balance between asphaltenes and saturates can cause colloidal instability and poor cracking resistance in asphalt that is indicative of a severely aged asphalt.

There have been many attempts to mitigate premature distress in asphalt. Some approaches have been more successful than others, and improvements in the resistance to load-related distress has certainly been greater than improvements in the resistance to age-related distress. Prior attempts to mitigate premature distress have included the use of various modifiers, including polymers, GTR, and scheduled preventive maintenance treatments throughout the pavement lifespan. The ability of various polymer and GTR modifiers to resist bottom-up fatigue cracking and rutting has been proven, but the ability of these modifiers to resist age-related cracking is still largely in doubt.

Emulsified Asphalt Performance Testing

Most required properties for emulsified asphalts are related to the emulsion stability, storability, transport, application (sprayability), break/set characteristics, and % asphalt and volatiles in the emulsion. For example, some combination of the following properties is common for most emulsions used for surface treatment applications: 24-hr storage stability/5-day settlement (stability/storability/transport), SFS Viscosity and Sieve (sprayability/chemical stability), Demulsibility/Cement Mixing (break/set characteristics), % Residue (% asphalt in the emulsion), and % Distillate (% volatiles in the emulsion). These properties tell us a great deal about the emulsion but practically nothing about the emulsified asphalt residue coating properties. Emulsions which are most common for surface treatment applications also typically include a few properties of the emulsion residue. TABLE 1 lists the residue properties that are commonly required by specification. These include Penetration (a measure of hardness at 25° C.), ductility (a control against brittleness, measured at 25° C.), and solubility (a control against asphalt impurities) are generally required for each grade. Additionally, a measure of elastic recovery is typically required for polymer modified grades to detect polymer effectiveness and %. Residue properties are most commonly extracted from the emulsion using residue by distillation (ASTM D6997-12) to separate the water from the residue. This gives the end-user the one of the closest approximations of the actual properties of the coating applied to the roadway. For cases in which a reactive polymer is included in the emulsion, a modification to the distillation extraction temperature is commonly allowed via the following alternative method (ASTM D7403). General requirements for these emulsion grades for any of the 50 states can be verified at Asphalt Institute's US State Spec Database.

process. Notice that the specification only lists a minimum requirement of 1.00 kPa and 2.20 kPa, respectively, for the original and RTFO-aged asphalt results. One way to view these values is that each represents a measurement of stiffness. What these values show is that an original asphalt is expected (and required) to undergo an increase in G*/sin δ (stiffness) of 120% during the mixing and laydown process

TABLE 1

Common emulsified asphalt residue spec requirements for emulsions typically used in surface treatment applications:

| | | Typical Requirements | | | | |
|---|---|---|---|---|---|---|
| | | Non-Polymer-modified | | | | |
| | AASHTO | CRS-1H/ CRS-2H/ SS-1H/ CSS-1H | CQS-1H/ QS-1H | CRS-1/ CRS-2/ RS-1/ RS-2 | Various | Polymer-modified |
| PROPERTY | TEST METHOD | | | | High Float Grades | CQS-1HP/ QS-1HP | CRS-2P/ CRS-2L |

Tests on Residue by Distillation ASTM D6997-12 (standard emulsion)/ASTM D7403 (allowed for polymer-modified):

| | | | | | | | |
|---|---|---|---|---|---|---|---|
| Penetration @ 25° C., dmm | T 49 | 40-90 min | | 40-250 min | | 40-90 min | 100-250 min |
| Ductility @ 25° C., cm | T 51 | | | | | 40-60 min | |
| Elastic Recovery, 10-25° C., % | T 301 | | N/A | | | | 30-50 min |
| Solubility in trichloroethylene, % | T 44 | | | | 97.5 min | | |

Essentially, the properties shown in TABLE 1 are valid for only for non-aged ("original") emulsified asphalt residue coatings, which potentially exist for a period of days or weeks but not further. As the asphalt viscosity data reported by Kandhal et al. (1973). *Shear Susceptibility of Asphalts in Relation to Pavements Performance* demonstrated earlier—Asphalt 1 showed a 1,900% increase in viscosity over 7 years, and even Asphalt 3, the asphalt least impacted by age-hardening, still showed a 300% increase in viscosity over 7 years. The viscosities for these six asphalts reported initially ranged from 900P to 2,800P (range of 1,900P). The viscosities for the six asphalts after 7 years in service ranged from 7,000P to 40,000P (range of 33,000P)! The properties of asphalt and emulsified asphalt residue coatings begin to change immediately after being introduced into service due of aging. Current state-of-the-practice specifications for emulsion residue do not typically offer prediction or control over the degradation in properties due to aging in service. These emulsified asphalt residue coatings and surface treatments typically fail within 1-7 years.

Requirements for Aging Resistant Asphalt Compositions

The PG grading system is the premier modern-day system that produces the best asphalts, but as demonstrated, many of the asphalts certified via the system are extremely flawed and result in premature failures related to surface-initiated distress. Even though asphalt aging has been studied extensively since the early-to-mid 90's when the PG grading system was first introduced, most of the aging studies have been confined to what equates to about a maximum of 7 years in service or a single pressure aging vessel (PAV) cycle of 20 hours. Further, other aspects of the specification simply disregard signs that premature age-hardening is an issue.

Aging Resistant Asphalt Compositions—Premature (Pre-Service) Aging Resistance

As shown above in FIG. 6, the DSR-derived result G*/sin δ is obtained first from the original (non-aged or non-age simulated) asphalt and then from the RTFO-aged asphalt. The latter result represents the asphalt primarily after volatilization, which occurs during the mixing and laydown to properly resist rutting once in service. Also, the mass change during the RTFO process is restricted at less than 1.00%, as shown. The mass loss restriction is meant to screen for asphalts that are susceptible to excessive volatilization during the mixing and laydown process—an important part of the specification. A standard method of testing would be as follows: The government transportation agency specifies a high temperature grade of 67° C. The original and RTFO-aged samples would then both be tested at 67° C. to ensure that G*/sin δ is greater than 1.00 kPa and 2.20 kPa, respectively. Also, mass loss is to be checked to ensure that it is less than 1.00%. If each of these requirements is met, the asphalt passes this portion of the specification.

However, it has been revealed that asphalts with poor colloidal stability (such as non-aged asphalts with bee structures), will undergo excessive age-hardening processes unrelated to mass loss (volatilization) during the mixing and laydown process (or during multiple heating cycles and application of an emulsified asphalt)—resulting in symptoms of premature aging before the asphalt even makes it into service. SARA and colloidal stability related variables (such as CI) can be useful to distinguish between asphalts that have a high probability of resisting aging versus asphalts that have a low probability of resisting aging. Because some asphalts with high colloidal stability will still experience similar premature (and even long-term) aging susceptibility, proper screening should be implemented to ensure that both high colloidal stability and resistance to aging according to various test procedures are present in the base asphalt prior to blending as the final asphalt composition to be used after blending, if blending is required. This effect of premature aging can be measured by performing a continuous grading (actual failing temperature) on an original asphalt sample and on an RTFO-aged asphalt sample.

In a continuous grading scheme, if both original and RTFO samples are tested at 67 C, and results were exactly 1.00 kPa and 2.20 kPa, the failing temperature for the original and RTFO-aged sample would be exactly 67° C. in both cases. However if, for example, the original asphalt sample failed at exactly 1.00 kPa and the RTFO sample failed at 4.5 kPa (instead of 2.20 kPa), the failure temperature for the original sample was 67° C., but the failure temperature for the RTFO-aged asphalt was a higher grade—let's say 71. This increase above and beyond 2.20 kPa signifies premature aging that has occurred (and will likely continue to occur while in service), resulting in excessive hardening of the asphalt. Nonetheless, the sample still "passes" specification if the mass loss is restricted at less than 1.00%.

FIG. 1 is a bar graph comparing Δ Failure Temperature (° C.) of a PG 67-22 asphalt against four exemplary samples according to the present invention. A Failure Temperature is defined as difference in high temperature failing grade between an original sample before aging and a sample after RTFO aging according to AASHTO T240-13. The far left bar is a "PG 67-22" sample meeting all requirements of AASHTO M 320-16, which is understood by the industry to produce a premium asphalt. PG 67-22 has a Δ Failure Temperature of 3.5 C. To the right are samples (A-D), denoted as "PG 67-22 (UHP, (Ultra High Performance))" are each exemplary, independent embodiments of a composition meeting the criteria of PG 67-22 asphalt and age-resistant asphalt composition for use in an age-resistant emulsified asphalt treatment product. The four embodiments of the age-resistant asphalt composition, A, B, C, and D, have Δ Failure Temperatures of 0.7° C., 0.2° C., 0.5° C., and minus (–) 0.31° C., respectively. The Δ Failure Temperature "Ultra High Performance Range" of less than 1.0° C. is denoted with the box on the graph. FIG. 1 represents a comparison of the susceptibility to premature aging (expressed in terms of increased high-temperature PG grade after RTFO test aging) between a conventional, premium PG-graded asphalt and four Example formulations of an aging resistant asphalt composition.

As shown, the "premium" PG-graded asphalt experienced a true grade increase of 3.5° C., which represents a substantial amount of premature aging, while maintaining a mass loss % of less than 1.00. The original (non-aged) high temperature true grade for this asphalt was 68.1° C. and the RTFO-aged true grade was 71.6° C. These are the specific temperatures at which the 1.00 kPa and 2.20 kPa minimum requirements were met. In comparison, four separate formulations [PG 67-22(UHP), shown as examples A to D] of the aging resistant asphalt composition were tested under the same conditions, and true grade increases only ranged from −0.31° C. to 0.70° C. The original (non-aged) high temperature true grades were 69.1° C., 69.9° C., 69.1° C., and 69.8° C.; the respective RTFO-aged true grades were 69.8° C., 70.1° C., 69.6° C., and 69.5° C. Each of these five asphalts meet the same grade, but the conventional PG 67-22 asphalt experienced an average of 1,300% more premature age-hardening than the aging resistant asphalt composition samples, PG 67-22 (UHP) examples A-D. The mass loss %'s for the 5 asphalts were all similar and well-within limits, ranging from −0.20 to −0.30%. Bear in mind that premature aging relative to Δ Failure temperature (or Δ PG grade increase) simulates aging that occurs before the pavement is even opened to traffic. The final RTFO grade should not be the focus of this analysis; what is most important is the trend—how much does the grade change due to RTFO aging. It should be understood that a higher change (Δ) signifies more premature age-hardening. The Δ Failure Temperature "Ultra High Performance Range" of less than 1.0° C. is denoted with the box on the graph. Remaining within this box signifies high resistance to premature age-hardening due to volatilization (caused by storing, heating, mixing, compacting, and other age-related factors) that occur at the very beginning of the asphalt's life cycle. Notably, all embodiments of age-resistant asphalt composition invention fall within the Ultra High Performance Range, while the conventional PG 67-22 "premium" asphalt sample shows a trend towards excessive premature aging failure vulnerability.

There are cases of asphalts that do not show premature aging susceptibility in short-term aging analysis, as explained here, but show extreme sensitivity to long-term aging. A truly age-resistant composition displays characteristics of both premature (short-term) and long-term aging resistance. The following sections provide details which explain and further differentiate the two.

Aging Resistant Asphalt Compositions—Long-Term (in-Service) Aging Resistance

One method that most strongly correlates to pavement distress is known as the Delta Temperature Critical ($\Delta T_c$) which can be calculated from data generated according to AASHTO M320-16. As presented in FIG. 6, AASHTO M320-16 requires measurement of S (creep stiffness) and m-value (rate of relaxation) at 60 seconds. $\Delta T_c$ is the difference between the continuous S failure temperature and the m-value failure temperature. The further that the two values are apart, the greater the susceptibility of asphalt to age-related, surface-initiated distress. Capturing the value under the standard (7-year) aging simulation provides some value, but the true test is extending the PAV aging from 20 hours up to 60 hours to simulate a much higher degree of aging—conceivably approximately 21 years in service. Continuous multiples of the PAV 20-hour testing period have previously been used by the Asphalt Institute to study the long-term aging susceptibility of asphalts containing REOB. A $\Delta T_c$ of −2.5° C. represents a cracking warning limit which indicates that the asphalt is susceptible to cracking onset or cracking initiation. A $\Delta T_c$ of −5.0° C. represents a cracking acceleration limit which indicates that cracking may be advanced and will imminently occur.

Figure 2:
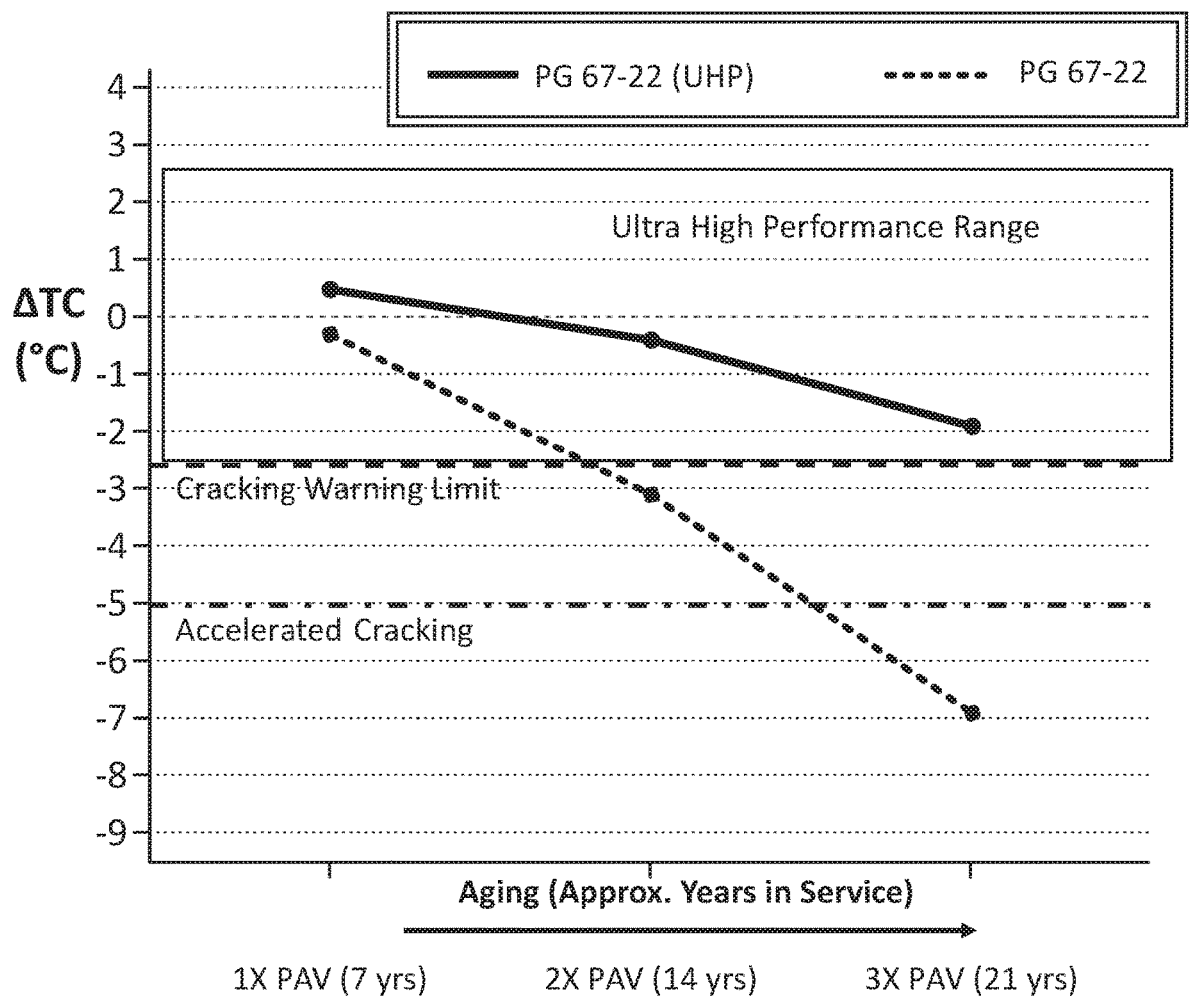
FIG. 2 is a graph of $\Delta T_c$ (° C.) on the Y-axis and simulated asphalt age on the X-axis, comparing asphalt resistance to long-term aging for a prior art PG 67-22 asphalt sample (dotted line) against an exemplary embodiment of an age-resistant asphalt composition meeting the criteria of PG 67-22 asphalt and for use in an age-resistant emulsified asphalt treatment product (solid line; "PG 67-22 (UHP)").

FIG. 2 is a graph comparing asphalt resistance to long-term aging for a PG 67-22 asphalt sample (dotted line) and a sample of an exemplary embodiment of an age-resistant asphalt composition meeting the criteria of PG 67-22 for use in an age-resistant emulsified asphalt treatment product (solid line; "PG 67-22 (UHP)"). Simulated asphalt age is shown on the X-axis (PAV cycle multiples) with time points for PAV-simulated aging of approximately 7 years, 14 years, and 21 years. $\Delta T_c$ (° C.) is shown on the Y-axis. The "Cracking Warning Limit" of $\Delta T_c$ (° C.) of minus (−) 2.5° C. and the "Accelerated Cracking" point of $\Delta T_c$ (° C.) of minus (−) 5.0° C. are shown on the graph. The $\Delta T_c$ "Ultra High Performance Range" of +/−2.5° C. is denoted with the box on the graph. FIG. 2, is a comparison of the susceptibility to long-term aging-related distress between a conventional, premium PG-graded asphalt (labeled as "PG 67-22") and one embodiment of aging resistant asphalt composition (labeled as "PG 67-22 (UHP)"). Time points for Pressure Aging Vessel ("PAV")-simulated aging of 7 years, 14 years, and 21 years are plotted (PAV cycle multiples) on the X-axis.

The 7-year simulation requires standard RTFO aging simulation per AASHTO T240-13 followed by a 20-hour simulation (single cycle) of PAV aging according to AASHTO R 28-12 (2016). At the completion of the 20-hour simulation, the PAV rack, which contains all asphalt samples (some which have reached the desired number of PAV cycles and some which have not) is removed from the PAV. Pans of material which have reached the desired aging level are removed from the rack and further handled according to AASHTO T240-13 prior to further testing of those samples. Pans of material which have not yet reached the desired aging level remain on the rack and are re-loaded into the PAV for an additional 20-hour cycle for a total of 40 hours (2 cycles). The process is then repeated for samples that have completed the desired number of aging cycles and for samples requiring an additional cycle for a total of 60 hours (3 cycles) of PAV aging.

ΔT$_c$ trends downward (negative trend) over extended periods of time for most asphalts. A lower (more negative) ΔT$_c$ signifies higher susceptibility to age-hardening and cracking distress. Remaining within the "Ultra High Performance Range" box indicates extremely high resistance to age-hardening and surface-induced cracking after the asphalt has been placed into service. As shown, ΔT$_c$ places both asphalts in the Ultra High Performance Range (i.e., a ΔT$_c$ within 2.5° C., which is the difference between m-value and S(t) for the same asphalt regardless of aging level) at the 7-year mark (the maximum simulated aging requirement for current specifications). What is revealed after comparing the two asphalts for resistance to extended aging (beyond 7 years) and surface-initiated distress is extraordinary. The embodiment of the aging resistant asphalt remained within the Ultra High Performance Range throughout the 21-year PAV aging simulation (ΔT$_c$ net change of only about −2.0), while the conventional PG 67-22 "premium" asphalt sample shows a trend towards excessive long-term aging failure vulnerability (ΔT$_c$ net change of about −6.5). The supposed "premium" conventional PG 67-22 asphalt declines rapidly towards the cracking limit and then into the accelerated cracking zone as defined by Anderson et al. (2011) well before reaching the typical 20+-year structural pavement design life. The cracking warning limit is surpassed at only 10-12 years, and the accelerated cracking limit is surpassed at approximately 17 years. Comparatively, the aging resistant asphalt composition PG 67-22 (UHP) remains above the cracking warning limit for the entire simulated 21-year cycle. By extrapolation, the aging resistant asphalt composition PG 67-22 (UHP) would not pass the cracking warning and the accelerated cracking limits until the 25-year and 40-year marks, respectively. This potentially translates to more than double the lifespan of resistance to aging and surface-initiated distress.

Consideration should also be given to whether critical cold temperature would govern after 25+ years in service in addition to ΔT$_c$. Comparison of extended aging resistance to critical cold temperature between a conventional, premium PG-graded asphalt (labeled as "PG 67-22") and an example of aging resistant asphalt composition (labeled as "PG 67-22 (UHP)"), is shown in FIG. 3.

Figure 3:
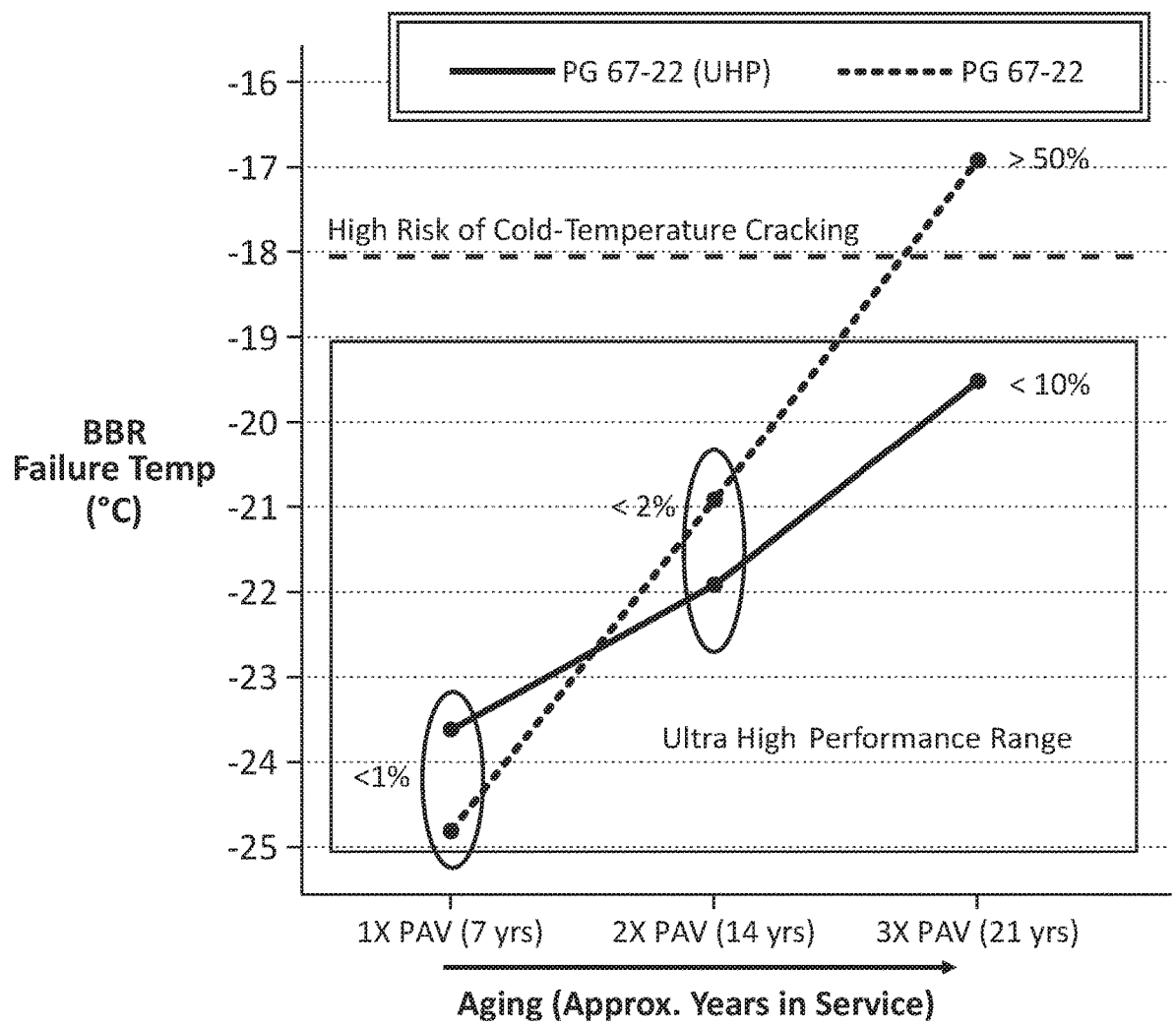
FIG. 3 is a line graph plotting asphalt resistance to extended aging-related distress expressed in terms of decline in cold temperature failing grade (increase in Bending Beam Rheometer ("BBR") Failure Temperature) for a conventional PG 67-22 asphalt sample (dotted line) and an exemplary age-resistant asphalt composition (solid line) meeting the criteria of PG 67-22 asphalt and for use in an age-resistant emulsified asphalt treatment product. The Y-axis is the BBR Failure Temperature (° C.) and the X-axis is time in multiples of seven (7)-year PAV-aging simulation cycles.
Figure 4A:
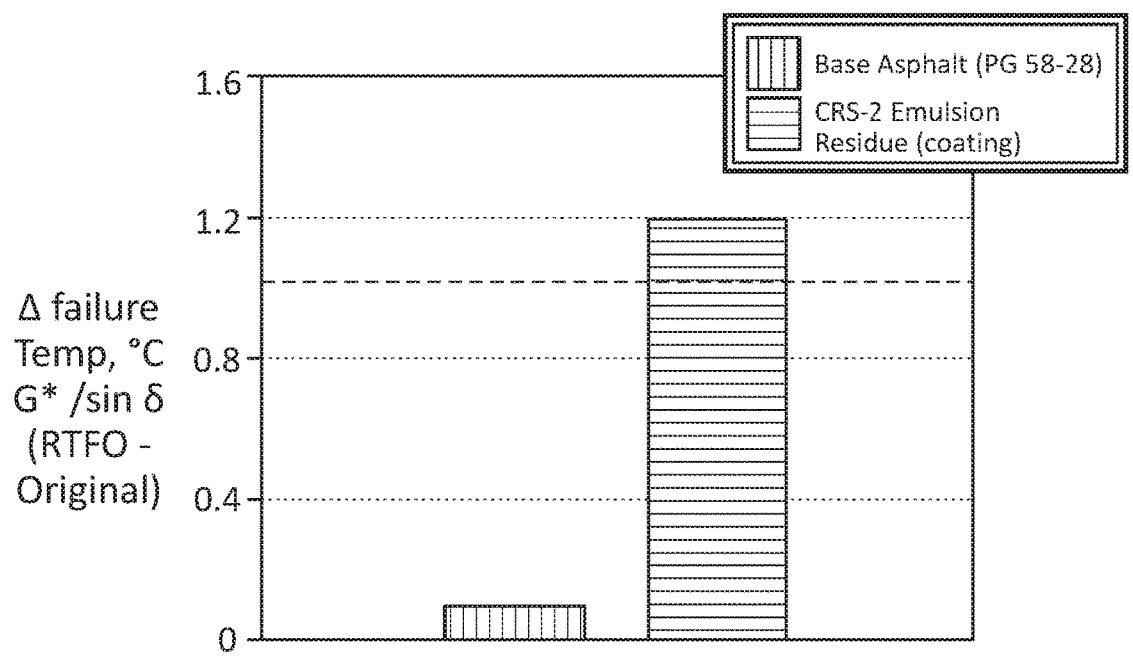
FIGS. 4A-4D are bar graphs showing relative age-resistance properties of an age resistant base asphalt compared to the properties of a residue of a CRS-2 emulsion made using the same age-resistant base asphalt and a standard emulsifier that is not selected according to the present invention.
Figure 4B:
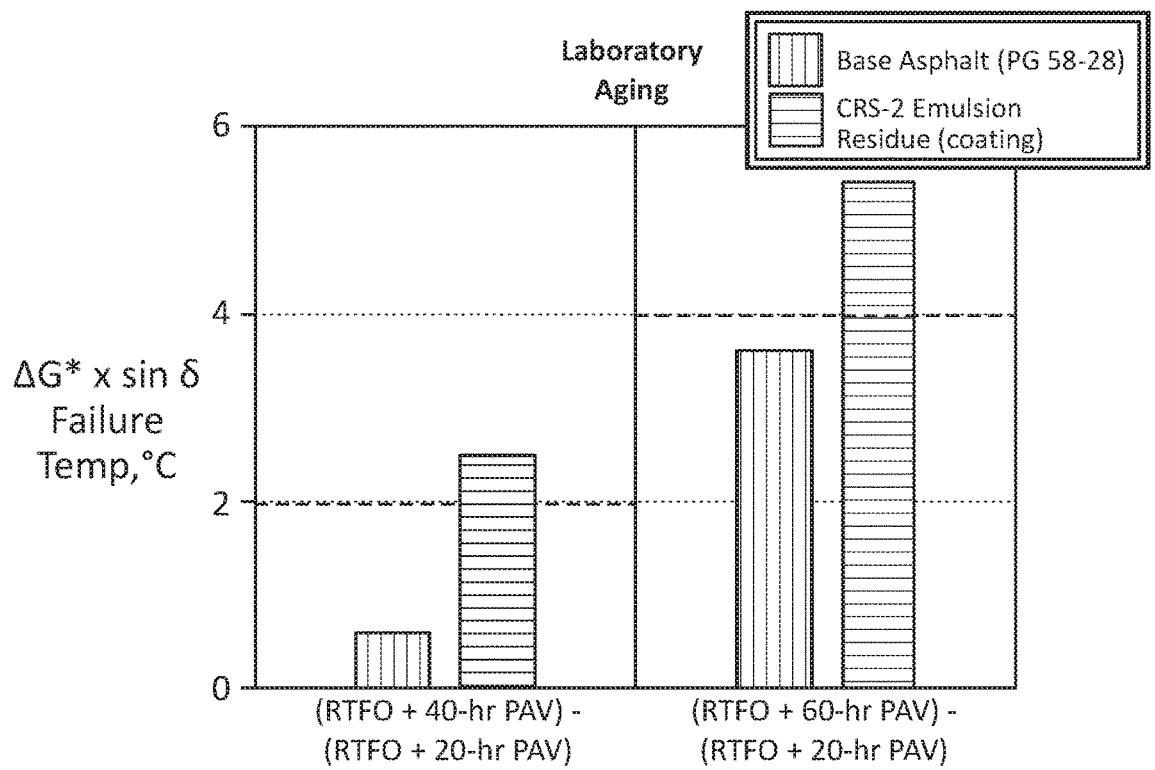
Figure 4C:
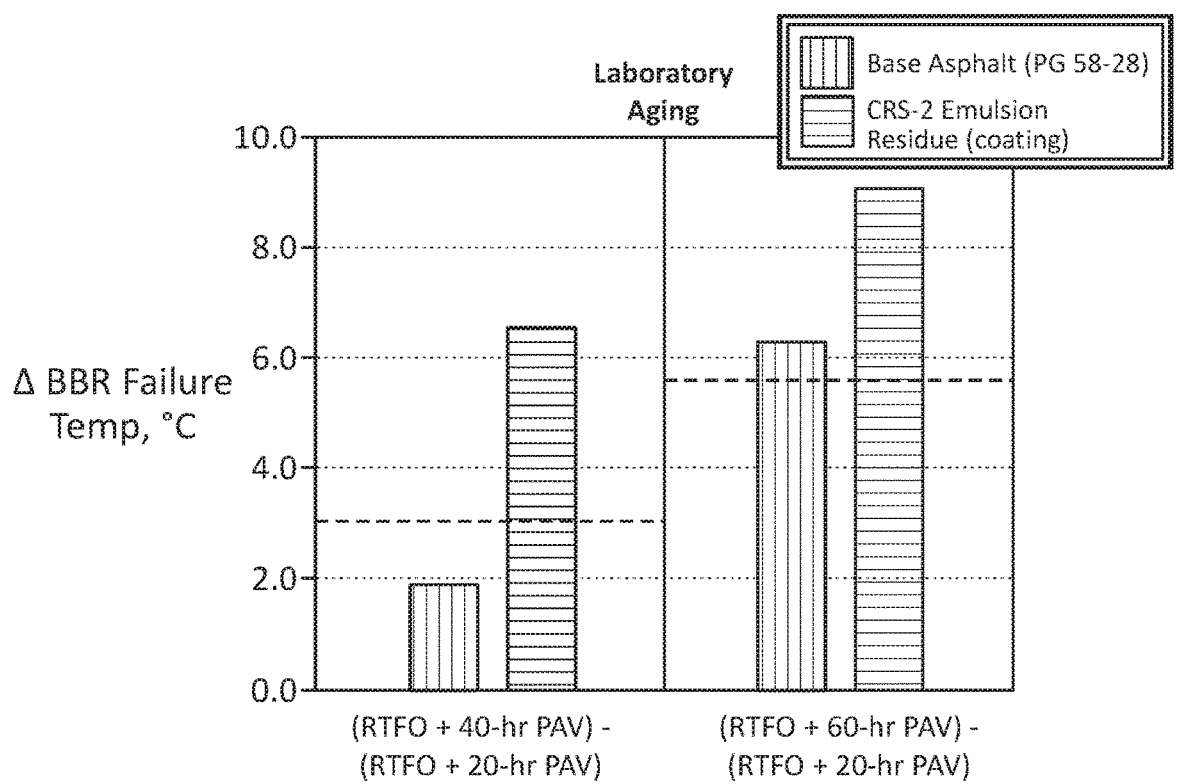
Figure 4D:
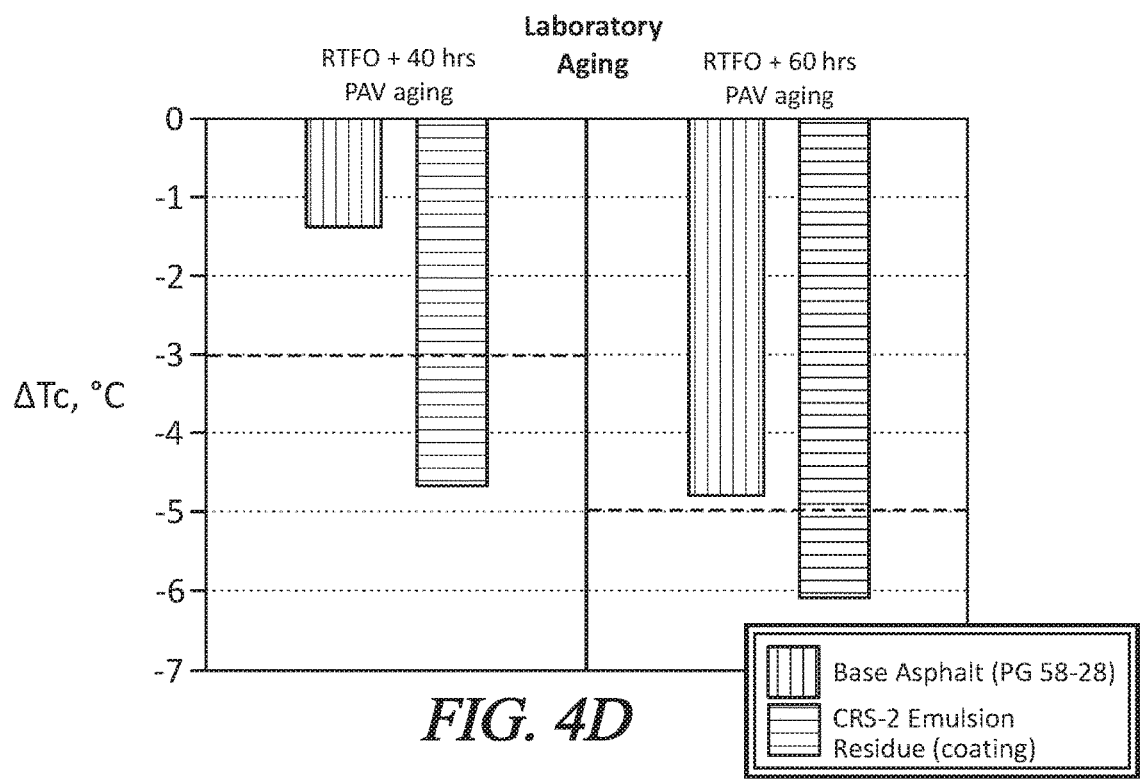
Figure 5A:
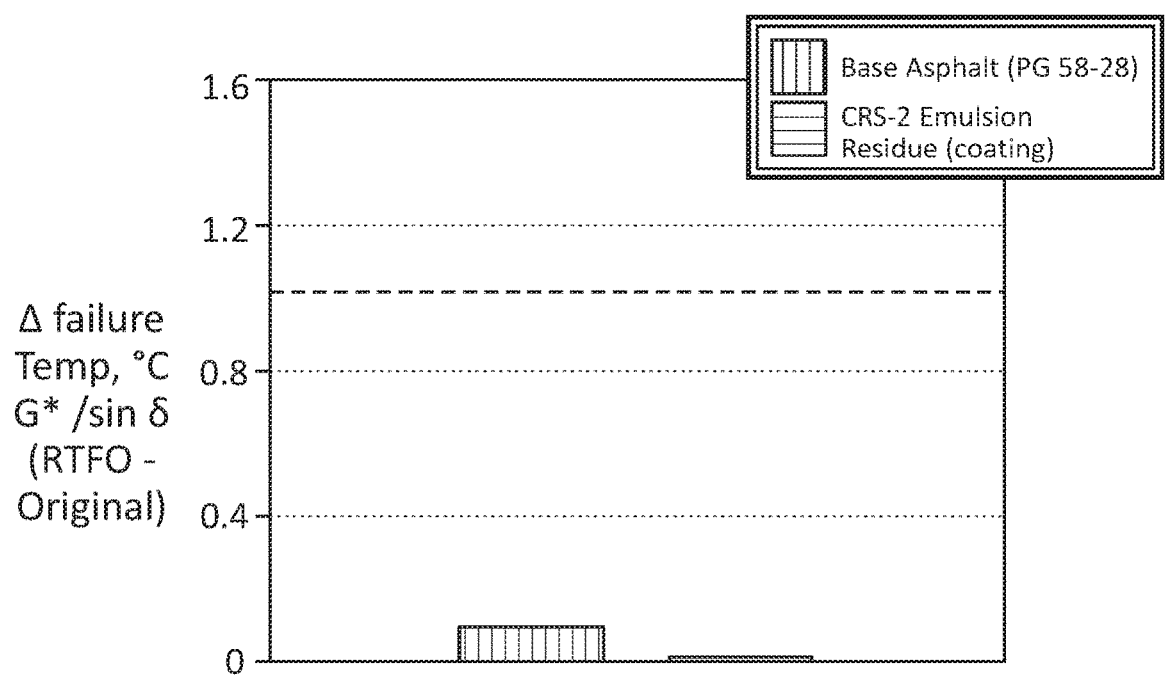
FIGS. 5A-5D are bar graphs showing relative age-resistance properties of an age resistant base asphalt compared to the properties of an age-resistant emulsion residue according to the present invention formed from a CRS-2 emulsion including the same age-resistant base asphalt and an aging inhibiting emulsifier.
Figure 5B:
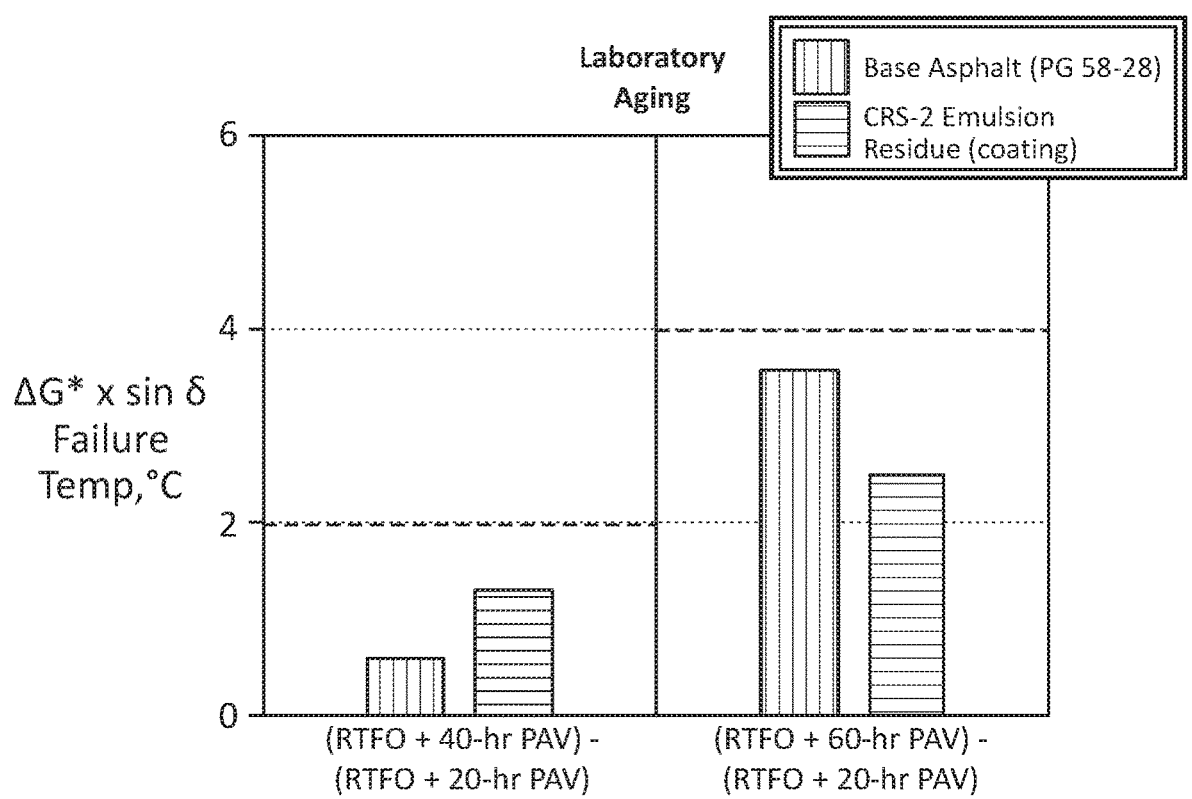
Figure 5C:
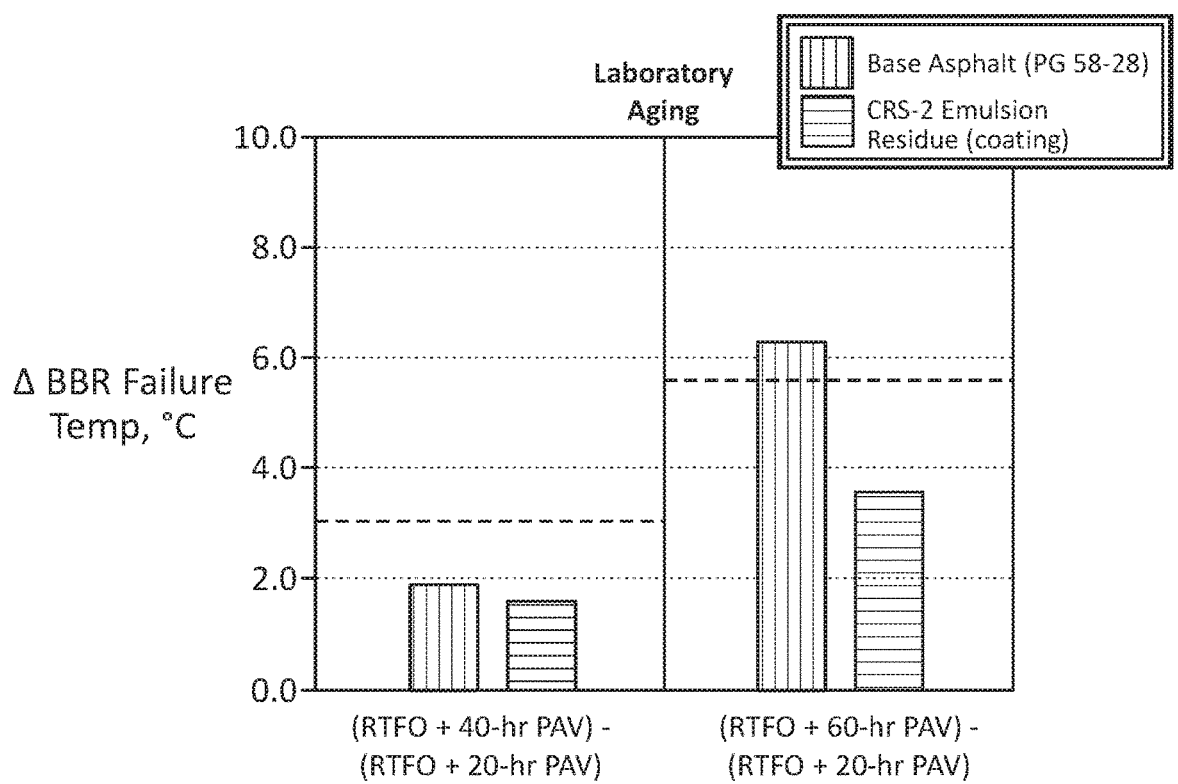
Figure 5D:
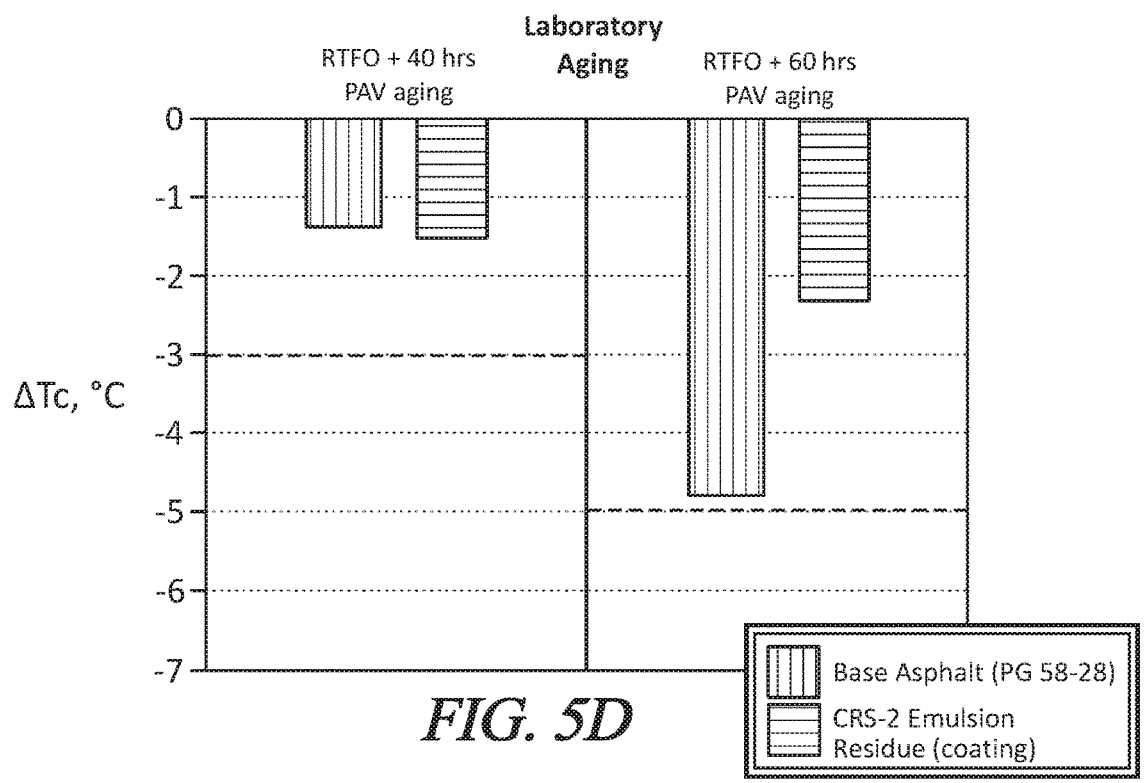

FIG. 3 is a graph comparing asphalt resistance to extended aging-related distress, expressed in terms of decline in cold temperature failing grade (increase in Bending Beam Rheometer ("BBR") Failure Temperature), for a conventional PG 67-22 asphalt sample (dotted line) and an exemplary age-resistant asphalt composition (solid line). The exemplary age-resistant asphalt composition meets the criteria of PG 67-22 asphalt and is suitable for use in an age-resistant emulsified asphalt treatment product. The Y-axis is the BBR Failure Temperature (° C.) and the X-axis is the simulated asphalt aging time represented in multiples of seven (7)-year PAV-aging simulation cycles. The BBR Failure Temperature "Ultra High Performance Range" ensures that the asphalt maintains approximately less than a 5.0° C. loss in BBR failure temperature between PAV-aging simulated 7 years and 21 years. High Risk of Cold-Temperature Cracking (dashed line at −18° C.) appears at approximately 1.0° C. above the Ultra High Performance Range. The "%" shown at each time point is the estimated probability that a 1-day annual minimum pavement temperature will exceed the failing temperature for the region.

The BBR failure temperature predicts the critical low temperature in which a particular asphalt can no longer resist thermal movements (expansion and contraction) due to increased stiffness and loss of relaxation properties. This graph relates to the low-temperature in the "PG 67-22" designation. The "-22" means that a particular asphalt can perform adequately in a cold temperature of approximately minus (−) 22° C. after approximately 7 years of aging (1×PAV cycle). Colder regions of the world may specify a lower temperature, such as −28° C. The opposite is true for warmer regions, such as −16° C. The grading occurs in 6° C. increments, so critical values falling between (−) 22° C. and (−) 27.9° C. are reported as −22° C. low temperature grade. Note that both asphalts in FIG. 3 meet the criteria for −22° C. grade at 7 years.

Since both cold temperature and age-hardening account for most stiffness increase and loss of relaxation properties in asphalt, the difference between each asphalt line (in which temperature is controlled) is attributed to the effects of age-hardening. The upper limit of the Ultra High Performance range will depend on the starting grade (and may therefore differ from this example), but the constant metric across all grades in which the invention applies is restricting the change in low-temperature grade to 5.5° C. between PAV-aging simulated 7 years and 21 years. As with premature aging resistance and ΔT$_c$ extended aging resistance, the aging resistant asphalt composition PG 67-22 (UHP) also offers major improvement in resisting decline in cold-temperature PG grade due to aging. Based on the simulation of probability that a regional cold temperature event causes excessive surface-initiated cracking, it is evident that a conventional "premium" PG 67-22 asphalt is at great risk of this occurrence after approximately 17 years in service. Conversely, the aging resistant asphalt composition PG 67-22 UHP remains at relatively low risk of a failing cold temperature event throughout the entire simulated analysis period of 21 years. The example embodiment of age-resistant asphalt composition remained within the Ultra High Performance Range throughout the simulated 21-year PAV aging simulation by losing only 4° C. in BBR failure temperature between PAV-aging simulated 7 years and 21 years, while the conventional PG 67-22 "premium" asphalt sample shows a trend towards excessive aging failure vulnerability as evidence by a loss of 8° C. in BBR failure temperature between PAV-aging simulated 7 years and 21 years. The PG 67-22 UHP is an exemplary embodiment of aging resistant asphalt meeting the requirements of premium PG 67-22 performance grade paving asphalt in addition to the added aging resistance benefits shown in FIGS. 2 & 3.

Asphalt binder ductility, measured in accordance with ASTM D 113-07, was a common performance measure utilized to assess the cracking susceptibility of the pavement structures. Binder ductility at 15.6° C. has been shown to correlate well to the cracking performance of the pavements after 10 years. The associated ductility performance threshold of 5 cm indicated the onset of cracking and a ductility value of 3 cm indicated extensive cracking in the pavements requiring resurfacing. Although ductility is a reliable predictor of binder aging, the method required to determine ductility of aged binder specimens is tedious and time-intensive. This led researches to develop less tedious parameters which correlate to ductility of aged binders. One such parameter is the Glover-Rowe (G-R) parameter.

Determining the G-R parameter requires more technical expertise to understand (compared to ductility and ΔT$_c$), but once the method is understood, it can be a relatively fast, easy, repeatable, and reliable binder aging performance indicator. Researchers have correlated the dynamic shear rheometer (DSR) function, G'/(η'/G') (where G' is the storage modulus, and η' is the dynamic viscosity of the binder) measured at 15° C. and 0.005 rad/s to the binder ductility measured at 15° C. and 1 cm/min for conventional unmodified binders at different aging conditions. Researchers have also reduced the DSR function to the presently known G-R parameter, as expressed in the following equation.

$$G-R = \frac{|G^*|(\cos\delta)^2}{\sin\delta}$$

where G* is the complex modulus and δ is the phase angle at 15° C. and 0.005 rad/s.

Figure 7:
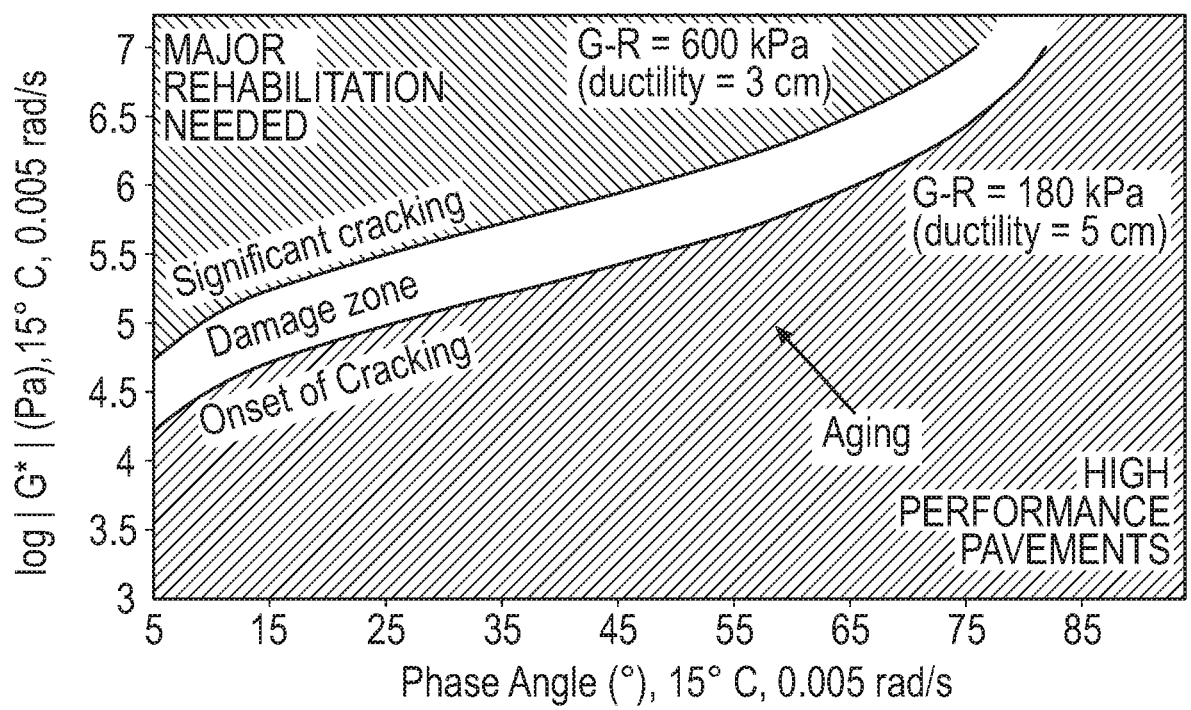
FIG. 7 is a Black Space diagram of a binder's G-R parameter values at different aging states.

The G-R parameter corresponds to the previously ductility thresholds of 5 cm and 3 cm at 180 kPa and 600 kPa respectively. A binder's G-R parameter values at different aging states are typically represented in the form of a Black Space diagram (as shown in FIG. 7) utilizing the G* and δ values 15° C. and 0.005 rad/s relative to the associated ductility failure planes to illustrate the binder's march to severe embrittlement.

Pavements that resist aging according to this parameter, contain binder with G-R parameter values that remain below the 180 kPa and 600 kPa thresholds for as long as possible. The aging resistant composition and methods described in this invention produce an asphalt binder composition which extends the binder PAV aging hours prior to crossing each of these critical G-R parameter thresholds.

Determination of G-R Parameter:

For the current work, G-R parameter values are determined by utilizing a modified version of the DSR frequency sweep testing originally proposed by Anderson et al. (2011), Evaluation of the relationship between asphalt binder properties and non-load related cracking, Journal of the Association of Asphalt Paving Technologists, 80, 615-663. DSR frequency sweeps from 100 to 0.01 rad/s (19 frequencies in logarithmic ramp) were performed at 5, 15, and 25° C. at strain levels 0.05, 0.25 and 0.50% respectively using 8-mm parallel geometry with a 2-mm gap at different aging states. The isothermal frequency sweep data at each aging state considered were fit using Excel™ solver to the commonly used Christensen-Anderson (CA) model (Christensen and Anderson (1992), Interpretation of dynamic mechanical test data for paving grade asphalt, Proceedings of the Association of Asphalt Paving Technologists, 61, 67-116) and a time-temperature superposition as presented in the equations below to develop master curves at a reference temperature of 15° C. and hence determine the G-R parameter at 0.005 rad/s.

$$G^*(\omega_r) = G_g\left[1 + \left(\frac{\omega_c}{\omega_r}\right)^{\frac{\log 2}{R}}\right]^{-\frac{R}{\log 2}}; \delta(\omega_r) = \frac{90}{\left[1 + \left(\frac{\omega_c}{\omega_r}\right)^{\left(\frac{\log 2}{R}\right)}\right]}$$

where $G_g$ is the glassy modulus (assumed a constant value of $10^9$ Pa at different aging stated), $\omega_c$ is the crossover frequency (where phase angle (δ) is 45°), R is the rheological index (determined as the difference between the glassy modulus ($G_g$) and the crossover modulus ($G_c$) i.e. modulus at $\omega_c$), and $\omega_r$ is the reduced frequency determined using the Williams-Landel-Ferry (WLF) equation for time-temperature superposition (Williams et al. (1955), Journal of American Chemical Society, Vol. 77, No. 14, pp. 3701-3707).

$$\omega_r = \omega\alpha(T); \log\alpha(T) = \frac{-C_1(T - T_{ref})}{C_2 + (T - T_{ref})}$$

where ω is angular frequency at which a measurement is performed, α(T) is the time-temperature shift factor to be applied to the measurement at an arbitrary temperature, T to move it to the reference temperature ($T_{ref}$=15° C. for the G-R parameter) at which the master curve is plotted, and $C_1$ and $C_2$ are arbitrary material constants dependent on the material and the reference temperature.

Another parameter, known as crossover temperature (COT), has been used to determine whether a binder has a suitable viscoelastic balance at in-service temperatures to resist distress—particularly surface initiated cracking after the binder has aged. Asphalt binder exhibits viscoelastic response at normal service temperatures. At any given temperature and frequency (or time), in mechanical terms, the binder possesses an elastic response parameter, known as storage modulus (G') and a viscous response parameter, known as loss modulus (G"). The binder behaves solid-like with some viscous response at lower service temperatures (G'>G") and fluid-like with some elastic response (G'<G") at higher service temperatures. The nature of the viscoelastic response is numerically expressed as phase angle (δ) where δ=0° corresponds to purely elastic response, δ=90° corresponds to purely viscous response, and δ=45° corresponds to the point where G'=G" where the binder transitions from solid-like to fluid-like response or vice-versa. The temperature at which G'=G" or δ=45° at a given time or frequency is called the COT ($T_{G'=G''}$). In terms of binder performance, this point can also be viewed as the rheological balance between the rutting and cracking performance at any point in the binder's life cycle. At a given frequency of loading, the magnitude of $T_{G'=G''}$ increases with aging implying that the binder predominantly exhibits elastic or rather brittle (with aging) response at normal service temperatures.

The critical distresses that the AASHTO M320-16 attempts to preclude at intermediate service temperatures (G*sin δ) and low service temperatures (S and m-value) are fatigue cracking and thermal cracking, respectively. These parameters were specified to ensure that the binder is viscous enough at these temperatures to prevent cracking in the pavements. However, a significant increase in $|T_{G'=G''}-PG_{low}|$ with aging may provide a more accurate prediction of cracking performance than the aforementioned PG specification parameters. Therefore, it is important to develop and utilize asphalt binders that are more resistant to an increase in COT value with aging. The aging resistant composition and methods described in this invention produce an asphalt binder composition which is more resistant to an increase in COT value with aging.

Determination of Crossover Temperature:

For the current work, COT ($T_{G'=G''}$) is determined at a given aging state utilizing the master curve fit parameters of the G-R DSR frequency sweep test data with $T_{ref}$=15° C. and the following equation.

$$T_{G'=G''} = -\frac{\left[(\log\frac{\omega_c}{10})(C_2 - T_{ref}) - T_{ref}C_1\right]}{\left[C_1 + \log\frac{\omega_c}{10}\right]}$$

The exemplary embodiments of PG 67-22 aging resistant asphalt are suitable for use in an aging resistant emulsified asphalt composition. In fact, this grade would be well-suited for various fog seal, slurry seal, and microsurfacing applications of aging resistant emulsified surface treatments. Various other grades of aging resistant asphalt, other than PG 67-22, are also suitable for use as a component in an aging resistant emulsified asphalt composition. Other treatments, such as chip seals for example, often require a softer grade of asphalt. An asphalt meeting the standard requirements of a PG 58-28 and additionally meeting the aging resistant requirements disclosed herein would be suitable for use to create an aging resistant emulsified asphalt chip seal. The following sections focus on the softer PG 58-28 asphalt grade, since this grade of asphalt typically yields an emulsion residue with a penetration value within the range of about 80 dmm to about 250 dmm, which is a common requirement for emulsions used in chip seal applications. Although different grades are shown as examples, the aging resistant properties may be interpreted in a similar manner across the different grades. However, it is important to note that this is just one component of the aging resistant asphalt compositions used in the aging resistant emulsified asphalt compositions taught herein.

Asphalt emulsion specifications requiring any level of aging to meet specification are extremely rare. Notable exceptions have been listed. The following sections focus on examples of aging resistant emulsified asphalt coatings primarily by utilizing many of the same testing methods and approaches summarized above to assess short-term and long-term aging susceptibility of emulsified asphalt residue coatings.

EXAMPLES

The various aspects of the invention will now be discussed with the aid of exemplary embodiments and examples. These exemplary embodiments and examples are non-limiting, and, as such, are provided for illustration of some of the useful and novel properties and characteristics of the invention in these forms. A person of skill in the art will understand from the following description that the inventive compositions and methods can be applied to other asphalt compositions and methods and may require alternate emulsifier chemicals and optional conventional asphalt and emulsifier additives that will and are contemplated to be within the scope of the invention.

Aging Resistant Asphalt and Aging Resistant Emulsified Asphalt Residue Compositions Below is presented TABLE 2, which provides Examples A, B, C, and D, respectively, of exemplary embodiments of the aging resistant asphalt composition. In this case the grades shown are PG 67-22. Table 3-6 present an additional example of an aging resistant asphalt composition of grade PG 58-22.

Although it is commonly assumed in the field that an emulsified asphalt residue coating will exhibit the properties of the asphalt used in the emulsion formula, we have found that this is not the case. Asphalt coatings deposited onto a substrate, base, sub-base, or riding surface by emulsified asphalts exhibit different properties than the base asphalt used to manufacture the emulsion. In many cases, the properties of the emulsion residue coating are significantly different than those of the base asphalt. More specifically, an aging resistant asphalt selected for use in an emulsion will not inherently impart age-resistant properties to the emulsified asphalt residue coating that is deposited onto a substrate.

In some embodiments, an aging resistant emulsified asphalt residue coating can be formed from an emulsion containing an aging resistant asphalt of the '306 application. The emulsion can include a first phase of the aging resistant asphalt combined with a second phase of water and chemicals that adequately stabilize the emulsion. When applied to a substrate and cured, the emulsion forms an aging resistant emulsified asphalt residue coating. Although aging resistant asphalt is a component of these aging resistant emulsified residue coating embodiments, this sole component may not dictate the properties of the final coating. Even if the best conditions were ensured while mixing and milling to produce a stable emulsion, the emulsified asphalt residue may still exhibit properties different from those of the asphalt used in the formula. The chemical composition of the emulsifier, in addition to the appropriate aging resistant asphalt composition can have a significant effect on the aging resistance performance of the residue.

Surprisingly, according to one aspect of the present invention, emulsions made using certain emulsifiers produce aging resistant emulsified asphalt residue coating with enhanced aging performance. FTIR spectroscopy analysis

TABLE 2

Chemical and Physical Properties of a representative PG 67-22 asphalt compared to formulations 3A-3D.

| PARAMETER | TEST METHOD | PG 67-22 | A | B | C | D |
|---|---|---|---|---|---|---|
| Naphthene Aromatics | ASTM D 4124 or IP 143 followed by IP 469 | 44.0 | 46.4 | 49.0 | 51.5 | 51.0 |
| Polar Aromatics (Resins) | | 30.4 | 32.2 | 34.4 | 34.5 | 35.7 |
| Saturates | | 10.6 | 8.0 | 5.1 | 3.8 | 3.1 |
| Asphaltenes | | 15.0 | 13.4 | 11.5 | 10.2 | 10.2 |
| Colloidal Index (CI) = ((NA + PA)/(S + A)) | N/A | 2.9 | 4.3 | 5.9 | 6.8 | 7.0 |
| Physical Properties (Original Asphalt) | | | | | | |
| Penetration, dmm | AASHTO T 49 | 52 | 52 | 52 | 59 | 63 |
| Softening Point, °C. | AASHTO T 53 | 53 | 51 | 52 | 51 | 51 |
| PG Grade | AASHTO M320 | 67-22 | 67-22 | 67-22 | 67-22 | 67-22 |
| Physical Properties (Aging-Specific) AASHTO T 240-13 and AASHTO R 28 | | | | | | |
| Δ Failure Temp, °C., G*/SIN (RTFO − Original) | AASHTO T 315 | 3.5 | 0.5 | −0.1 | 0 | 0 |
| Δ BBR Failure Temp, °C. (RTFO + 40-hr PAV) − (RTFO + 20-hr PAV) | AASHTO T 313 | 3.9 | 2.2 | 2.2 | 2.3 | 2.0 |
| Δ BBR Failure Temp, °C. (RTFO + 60-hr PAV) − (RTFO + 20-hr PAV) | | 7.8 | 4.1 | 4 | 5.4 | 5.1 |
| Δ Tc, °C. (RTFO + 40-hr PAV) | | −3.1 | −0.4 | −0.6 | −1.7 | −1.0 |
| Δ Tc, °C. (RTFO + 60-hr PAV) | | −6.8 | −1.9 | −2.5 | −3.0 | −2.8 | according to ASTM E1252-98(2013)e1 has identified chemical components present in some emulsifiers that are detrimental and can significantly affect the aging performance of the residue.

FTIR is a technique frequently utilized to determine the infrared absorption spectrum of a sample wherein the absorption spectrum can be considered as the chemical fingerprint of the sample. By comparing the absorption spectra at the known peak frequencies (or wavenumbers) of various functional groups, compounds and molecules to the FTIR measurements across the spectral range from 4000 to 600 $cm^{-1}$, the chemical components of a number of emulsifiers that were used to make aging resistant emulsified asphalt residue coatings were identified. Emulsifiers or emulsifying agents which improved the aging resistant properties of the residue ("aging inhibiting emulsifiers") as compared with standard emulsifiers typically had some of the features or combinations of the following features: substantially devoid of free hydroxide anions ($OH^-$), or intramolecular hydrogen bonds, or intermolecular hydrogen bonds associated with a hydroxyl group (—OH - - - H); substantially devoid of intermolecular hydrogen bond associated with a primary amine (—$NH_2$), or a secondary amine (—NH), or an amide (R—CO—NH2); substantially devoid of unsaturated nitrogen associated with a carbon atom or an alkyl group or an aryl group or as a cyclic compound (cyclic amine); substantially devoid of unsaturated carbon in the form of ketone or carboxylic acid or dicarboxylic anhydrides; substantially devoid of ester groups in the form of formates or acetates or benzoates; may contain a polymer group such as styrene-butadiene-styrene (SBS). In the context of these FTIR measurements, the terms substantially devoid or essentially free indicates that a peak is not registered at the FTIR spectral range where the reference component should appear.

The following examples show the effects of improper emulsion formulation on the aging resistant properties of an emulsified asphalt residue coating containing an aging resistant asphalt.

In an earlier section (TABLE 1), several emulsions were identified which are commonly used in surface treatment applications. The number of emulsions that can possibly be used in a variety of surface treatment applications are too numerous to show detailed examples of each. The examples in this section are specific to a single grade of emulsion, cationic rapid set, high viscosity "CRS-2", in which an equivalent version of this emulsion is commonly used in chip seal applications throughout the United States and beyond. However, the examples should be understood to apply to various grades of emulsion commonly used in surface treatment applications. An example of a typical CRS-2 emulsified asphalt specification is shown in TABLE 3. (Note that only three emulsified asphalt residue results are required and none predict aging susceptibility).

TABLE 3

CRS-2 Emulsion - Typical Properties and Results.

| Test | AASHTO Method | Specification Min | Specification Max | Result |
|---|---|---|---|---|
| Viscosity, SFS @ 50° C., | T 72 | 100 | 400 | 180 |
| Demulsibility, % | T 59 | 40 | — | 105 |
| Particle Charge | | Positive | | Positive |
| Sieve, % | | — | 0.1 | 0.08 |
| Distillation Residue, % | | 65 | — | 67.5 |
| Oil distillate, % by volume | | — | 3.0 | 0.50 |

TABLE 3-continued

CRS-2 Emulsion - Typical Properties and Results.

| Test | AASHTO Method | Specification Min | Specification Max | Result |
|---|---|---|---|---|
| Tests on Residue by Distillation (ASTM D6997-12): | | | | |
| Penetration, dmm | T 49 | 80 | 250 | 115 |
| Ductility, cm | T 51 | 40 | — | 100+ |
| Solubility, % | T 44 | 97.5 | — | 99+ |

FIGS. 4A-4D are bar graphs showing relative properties of an age-resistant base asphalt compared to the properties of the residue formed from a CRS-2 emulsion made using the same age-resistant base asphalt and a standard emulsifier. Residue was then extracted from the CRS-2 emulsion per ASTM D6997-12 and tested. The four graphs show properties related to aging sensitivity. Taller bars represent higher aging sensitivity for each parameter listed. The dotted-line shown for each data set represents a threshold below which the asphalt or asphalt residue coating is deemed to be aging resistant. Note the increase in aging sensitivity of the emulsion residue coatings compared to the base asphalts used to make the emulsions.

The graphs of FIG. 4 highlight several properties of a suitable aging resistant PG 58-28 base asphalt (light grey bars) and an emulsified asphalt residue coating (dark grey bars) containing the same aging resistant PG 58-28 base asphalt. Four separate test parameters which have been linked to aging susceptibility, (A.) Δ G*/sin δ, (B.) Δ G*(sin δ), (C.) Δ BBR failure temp, and (D.) ΔTc are shown in the figure. Parameters (A.), (C.), and (D.) were described in detail in earlier sections. Parameter (B.) also captures the degrading effects of aging in many asphalts and asphalt coatings. Parameter (B.) is typically used to predict fatigue cracking-susceptibility in PG graded asphalts, although it is rarely investigated beyond a single (20-hr) PAV aging cycle. Each of these parameters contain "Δ," which represents change in the parameter during the designated period of aging. The amount of aging is noted in each graph as either non-aged (original), RTFO-aged, 20-hr PAV-aged, 40-hr PAV-aged, 60-hr PAV-aged, or a combination/subtraction at multiple points of aging.

FIGS. 5A-5D are graphs comparing the aging properties of age-resistant base asphalt and the aging properties of age-resistant emulsion residue coating formed from a CRS-2 emulsion including the same age-resistant base asphalt and an aging inhibiting emulsifier rather than a standard emulsifier used in the examples of FIG. 4. The residue properties were measured on a residue extracted from the CRS-2 emulsion per ASTM D6997-12. The four graphs show properties related to aging sensitivity. Taller bars represent higher aging sensitivity for each parameter listed. The dotted-line shown for each data set represents a threshold below which the asphalt or asphalt residue coating is deemed to be aging resistant. In the examples of FIG. 5, emulsion residue coatings show superior age-resistant properties for each parameter tested as compared with the examples of FIG. 4, which can be attributed to the aging inhibiting emulsifier.

TABLES 4, 5, and 6 show numerous properties of four compositions: a base asphalt composition that is not suitable as a component of the invention ("E."), a base asphalt composition that is suitable as a component of the invention ("F."), and two separate emulsions residue compositions [("G." and "H.")—both of which were made using the "suitable" base asphalt]. Composition "H" is an embodiment of the invention. Notations are made in the tables as these compositions relate to FIGS. 4 & 5.

The properties shown in TABLE 4 are standard properties required for CRS-2 emulsion residue coatings. Note that there is not a notable difference in results for any of the four compositions.

TABLE 4

Standard Properties Required for CRS-2 Residue Coatings. (Properties also shown for two non-emulsified base asphalts for comparison purposes).

| | | | Results | | | |
|---|---|---|---|---|---|---|
| | | | Base Asphalts | | Emulsion Residue Coatings | |
| | | | | | (G.) Standard CRS-2 | (H.) "Age-Resistant" |
| PROPERTY | AASHTO TEST METHOD | SPEC | (E.) Standard PG 58-28 (Not Suitable for Invention) | (F.) "Age-resistant" PG 58-28 (Light-Grey Bars - FIGS. 4 and 5) | (Dark-Grey Bars - FIG. 4) | CRS-2 (Dark-Grey Bars - FIG. 5) |
| | | | | | Tests on Residue by Distillation (ASTM D6997-12): | |
| ORIGINAL (NON-AGED) ASPHALT/EMULSION RESIDUE: | | | | | | |
| Penetration @ 25° C., dmm | T 49 | 90-250 | 115 | 113 | 111 | 115 |
| Ductility @ 25° C., cm | T 51 | 60 min | 150+ | 150+ | 150+ | 150+ |
| Solubility, % | T 44 | 97.5 min | 99.9+ | 99.9+ | 99.9+ | 99.9+ |

TABLE 5 shows the same four compositions from the previous table. The properties shown for this table are standard for PG-graded asphalt used in non-aqueous applications. These properties are also similar to the state of the art teachings and implementation [NCHRP 14-17 (2010). *Manual for Emulsion-Based Chip Seals for Pavement Preservation*; TXDOT 5-6616. *Statewide Implementation of the Surface Performance Graded (SPG) Specification for Seal Coat Binders in Service* (Aug. 31, 2017 completion date)]. Similar to TABLE 4 properties, there is not a notable difference in results for any of the four compositions. The purpose of the PG grade system is to assign a PG grade to an asphalt as explained in earlier sections. The grade, itself, certifies the asphalt for use as a "premium" selection. Each of these four compositions meet all requirements for a PG 58-28 composition. As noted earlier, these properties are not common for emulsion residue coatings, although state-of-the-art NCHRP 14-17 and TXDOT 5-6616 have pursued and succeeded in implementing these PG grade properties to improve beyond the limited information given in the previous TABLE 4.

TABLE 5

Standard PG Asphalt and State of the Art Emulsion spec.

| | | | Results | | | |
|---|---|---|---|---|---|---|
| | | | | | (G.) Standard CRS-2 | (H.) "Age-Resistant" |
| PROPERTY | AASHTO TEST METHOD | SPEC | (E.) Standard PG 58-28 (Not Suitable for Invention) | (F.) "Age-resistant" PG 58-28 (Light-Grey Bars-FIGS. 4 and 5) | (Dark-Grey Bars - FIG. 4) | CRS-2 (Dark-Grey Bars - FIG. 5) |
| | | | | | Tests on Residue by Distillation (ASTM D6997-12): | |
| ORIGINAL ASPHALT/EMULSION RESIDUE: | | | | | | |
| SUPERPAVE PG Asphalt Emulsion Residue True Grade PG Grade | M 320 | Report | PG59.8-32.0 PG58-28 | PG59.5-29.5 PG58-28 | PG59.1-30.4 PG58-28 | PG59.0-29.6 PG58-28 |
| Rotational Viscosity, 135° C. Pa·s | T 316 | 3.0 max | .278 | 0.286 | 0.284 | 0.279 |
| Dynamic Shear, kPa  58° C. (G*/sin δ, 10 rad/sec)  64° C. | T 315 | 1.0 min | 1.25 0.60 | 1.21 0.57 | 1.16 0.55 | 1.14 0.55 |
| True Grade | | P/F temp | 59.8 | 59.5 | 59.1 | 59.0 |
| RTFO ASPHALT/EMULSION RESIDUE: AASHTO T 240-13 | | | | | | |
| Mass Loss, % | T 240 | 1.0 max | −.384 | +0.149 | −0.04 | −0.38 |
| Dynamic Shear, kPa  52° C. (G*/sin δ, 10 rad/sec)  58° C.  64° C.  70° C. | T 315 | 2.2 min | — 4.98 2.36 1.15 | 6.29 2.72 1.22 — | — 2.97 1.36 — | — 2.51 1.17 — |

TABLE 5-continued

Standard PG Asphalt and State of the Art Emulsion spec.

| PROPERTY | | | AASHTO TEST METHOD | SPEC | (E.) Standard PG 58-28 (Not Suitable for Invention) | (F.) "Age-resistant" PG 58-28 (Light-Grey Bars-FIGS. 4 and 5) | (G.) Standard CRS-2 (Dark-Grey Bars - FIG. 4) | (H.) "Age-Resistant" CRS-2 (Dark-Grey Bars - FIG. 5) |
|---|---|---|---|---|---|---|---|---|
| | | | | | | | Tests on Residue by Distillation (ASTM D6997-12): | |
| True Grade | | | | P/F temp | 64.6 | 59.6 | 60.3 | 59.0 |
| RTFO + PRESSURE AGING (20-HRS) EMULSION RESIDUE: AASHTO R 28 100° C. | | | | | | | | |
| Dynamic Shear, kPa (G *(sin δ), 10 rad/sec) | 10° C. 13° C. 16° C. 19° C. | | T 315 | 5,000 max | — 6000 4280 — | — — 5850 4070 | — — 5790 3950 | — — 5580 3910 |
| True Grade | | | | P/F temp | 14.6 | 17.3 | 17.1 | 16.9 |
| Creep Stiffness | S(t), MPa (60 sec) | -18° C. | T 313 | 300 max | 155 | 255 | 237 | 222 |
| | m-value | | | 0.300 min | .326 | .314 | 0.333 | 0.315 |
| | S(t), MPa (60 sec) | -24° C. | T 313 | 300 max | 322 | 477 | 429 | 463 |
| | m-value | | | 0.300 min | .287 | .257 | 0.225 | 0.258 |
| | m-value (PG) | | | P/F temp | -32.0 | -29.5 | -30.5 | -29.6 |
| | Stiffness (PG) | | | P/F temp | -33.4 | -29.6 | -30.4 | -30.5 |

TABLES 6 and 7 show data and analysis for the same four compositions after being exposed to various short-term and long-term aging simulations and analyzed as noted. TABLE 6 shows the extended aging raw data, and TABLE 7 shows a more focused analysis of the aging susceptibility of the compositions by combining data from TABLES 5 and 6.

TABLE 6

Asphalt and emulsified asphalt residue properties after long-term aging stimulations (40-hour and 60 hour PAV.)

| PROPERTY | | | AASHTO TEST METHOD | SPEC | (E.) Standard PG 58-28 (Not Suitable for Invention) | (F.) "Age-resistant" PG 58-28 (Light-Grey Bars - FIGS. 4 and 5) | (G.) Standard CRS-2 (Dark-Grey Bars - FIG. 4) | (H.) "Age-Resistant" CRS-2 (Dark-Grey Bars - FIG. 5) |
|---|---|---|---|---|---|---|---|---|
| | | | | | | | Tests on Residue by Distillation (ASTM D6997-12): | |
| RTFO + PRESSURE AGING (40-HRS) ASPHALT/EMULSION RESIDUE: AASHTO R 28 100° C. | | | | | | | | |
| Dynamic Shear, kPa (G *(sin δ), 10 rad/sec) | 16° C. 19° C. 22° C. | | T 315 | 5,000 max | 5630 4130 — | 6380 4370 — | — 5380 3780 | 6550 4520 — |
| True Grade | | | | P/F temp | 17.1 | 17.9 | 19.6 | 18.2 |
| Creep Stiffness | S(t), MPa (60 sec) | -12° C. | T 313 | 300 max | 92 | 133 | 125 | — |
| | m-value | | | 0.300 min | .325 | .344 | 0.312 | — |
| | S(t), MPa (60 sec) | -18° C. | | 300 max | 185 | 268 | 276 | 255 |
| | m-value | | | 0.300 min | .298 | .297 | 0.275 | 0.300 |

TABLE 6-continued

Asphalt and emulsified asphalt residue properties after long-term aging stimulations (40-hour and 60 hour PAV.)

| PROPERTY | | AASHTO TEST METHOD | SPEC | (E.) Standard PG 58-28 (Not Suitable for Invention) | (F.) "Age-resistant" PG 58-28 (Light-Grey Bars - FIGS. 4 and 5) | (G.) Standard CRS-2 (Dark-Grey Bars - FIG. 4) | (H.) "Age-Resistant" CRS-2 (Dark-Grey Bars - FIG. 5) Tests on Residue by Distillation (ASTM D6997-12): |
|---|---|---|---|---|---|---|---|
| S(t), MPa (60 sec) | −24° C. | T 313 | 300 max | — | — | — | 494 |
| m-value | | | 0.300 mm | — | — | — | 0.236 |
| m-value (PG) | | | P/F temp | −27.6 | −27.6 | −23.9 | −28.0 |
| Stiffness (PG) | | | P/F temp | −32.2 | −29.0 | −28.6 | −29.5 |
| RTFO + PRESSURE AGING (60-HRS) ASPHALT/EMULSION RESIDUE: AASHTO R 28 100° C. | | | | | | | |
| Dynamic Shear, kPa (G *(sin δ), 10 rad/sec) | 16° C. | T 315 | 5,000 max | 5330 | 6190 | — | 5210 |
| | 19° C. | | | 3980 | 4950 | 5290 | 3670 |
| | 22° C. | | | — | — | 3850 | — |
| True Grade | | | P/F temp | 19.7 | 20.9 | 22.5 | 19.4 |
| Creep Stiffness S(t), MPa (60 sec) | −12° C. | T 313 | 300 max | — | — | 76 | — |
| m-value | | | 0.300 min | — | — | .328 | — |
| S(t), MPa (60 sec) | −18° C. | | 300 max | 103 | 149 | 156 | 129 |
| m-value | | | 0.300 min | .305 | .308 | 0.297 | 0.331 |
| S(t), MPa (60 sec) | −24° C. | T 313 | 300 max | 207 | 301 | — | 290 |
| m-value | | | 0.300 mm | .280 | .268 | — | 0.284 |
| m-value (PG) | | | P/F temp | −23.2 | −23.2 | −21.4 | −26.0 |
| Stiffness (PG) | | | P/F temp | −31.2 | −28.0 | −27.5 | −28.3 |

TABLE 7

Summary and analysis of asphalt and emulsified asphalt residue coating properties after short-term and long-term aging simulations (RTFO, 40-hour, and 60-hour PAV).

| Aging Property | Claim | (E.) Standard PG 58-28 (Not Suitable for Invention) | (F.) "Age-resistant" PG 58-28 (Light-Grey Bars - FIGS. 4 and 5) | (G.) Standard CRS-2 (Dark-Grey Bars - FIG. 4) | (H.) "Age-Resistant" CRS-2 (Dark-Grey Bars - FIG. 5) Tests on Residue by Distillation (ASTM D6997-12): |
|---|---|---|---|---|---|
| Δ Failure Temp, ° C., G*/SIN (RTFO − Original) | 1.0 max | 4.8 | 0.1 | 1.2 | 0 |
| Δ Failure Temp, ° C. (G * (sin δ)) | (RTFO + 40-hr PAV) − (RTFO + 20-hr PAV) | 2.0 max | 2.5 | 0.6 | 2.5 | 1.3 |
| | (RTFO + 60-hr PAV) − (RTFO + 20-hr PAV) | 4.0 max | 5.1 | 3.6 | 5.4 | 2.5 |

TABLE 7-continued

Summary and analysis of asphalt and emulsified asphalt residue coating properties after short-term and long-term aging simulations (RTFO, 40-hour, and 60-hour PAV).

| Aging Property | | Claim | (E.) Standard PG 58-28 (Not Suitable for Invention) | (F.) "Age-resistant" PG 58-28 (Light-Grey Bars - FIGS. 4 and 5) | (G.) Standard CRS-2 (Dark-Grey Bars - FIG. 4) Tests on Residue by Distillation (ASTM D6997-12): | (H.) "Age-Resistant" CRS-2 (Dark-Grey Bars - FIG. 5) |
|---|---|---|---|---|---|---|
| Δ BBR Failure Temp. ° C. | (RTFO + 40-hr PAV) − (RTFO + 20-hr PAV) | 3.0 max | 4.4 | 1.9 | 6.6 | 1.6 |
| | (RTFO + 60-hr PAV) − (RTFO + 20-hr PAV) | 5.5 max | 8.8 | 6.3 | 9.1 | 3.6 |
| Δ Tc, ° C. | RTFO + 40-hr PAV | −3.0 min | −4.6 | −1.4 | −4.7 | −1.5 |
| | RTFO + 40-hr PAV | −5.0 min | −8.0 | −4.8 | −6.1 | −2.3 |

As shown, the four compositions meeting all the same requirements in TABLES 4 and 5 and thus being certified as "equals" per state-of-the-practice asphalt, state-of-the practice emulsion residue, and state of the art emulsion residue specifications are drastically different in terms of both premature and long-term aging susceptibility depicted in TABLES 6 and 7. By examining the data and criteria in TABLE 7, the reasons that the standard PG 58-28 (Composition "E.") is "Not Suitable for the Invention" become apparent. Further, by examining the properties of Compositions "F," "G," and "H", it is also apparent that properties of an age-resistant base asphalt are not inherently imparted to the emulsified asphalt residue coating. In fact, Compositions "G," and "H" of TABLE 7 show two coatings that will age in a dramatically different manner per seven independent evaluation methods which are known to predict age-sensitivity. As noted previously, Composition "H" is an embodiment of the invention which shows a substantial improvement in resistance to aging susceptibility indicators reported herein. Composition "H" also shows the best aging resistance of the four compositions, including the aging resistant base asphalt used to make the emulsion. Although both Compositions "G" and "H" used aging resistant asphalt as a formulation component, only Composition "H" followed the complete teachings required to practice the invention: the chemical and physical properties of the aging resistant asphalt composition providing the first aging resistant asphalt composition phase, and the emulsifiers, stabilizers, and additives are selected so that the asphalt composition may be combined with the water phase at temperatures and under mixing conditions that produce a successful, stable emulsion and a successful, age-resistant coating. The formulation for Composition "H" (aging resistant CRS-2 cationic rapid set, high viscosity "CRS-2" emulsified asphalt grade), included following components by weight of the finished emulsion: 68.50% aging resistant asphalt composition as described herein, 30.88% suitable emulsion water, 0.40% Redicote E-4900 (cationic rapid set, viscosity building emulsifier offered by Akzo Nobel since 2016), and 0.22% hydrochloric acid.

Special note: even though AASHTO R 28 allows different PAV temperatures for different PG grades, the data presented herein and the following claims are based on PAV aging at 100° C. across all grades to provide a consistent aging environment for vetting aging susceptibility of various compositions. Further, although various extraction methods are often permitted for determining residue properties of the emulsion and approximating cured coating properties, all references herein to "emulsified asphalt residue" or a "cured coating" should be determined and verified using ASTM D6997-12 to separate the water from the residue. For cases in which a reactive polymer is included in the water phase of the emulsion, ASTM D7403 should be used as the extraction method.

The invention has been described with reference to various specific and preferred embodiments and techniques. However, it should be understood that many variations and modifications may be made while remaining within the spirit and scope of the invention. It will be apparent to one of ordinary skill in the art that methods, devices, device elements, materials, procedures and techniques other than those specifically described herein can be applied to the practice of the invention as broadly disclosed herein without resort to undue experimentation. All art-known functional equivalents of methods, devices, device elements, materials, procedures and techniques described herein are intended to be encompassed by this invention. Whenever a range is disclosed, all subranges and individual values are intended to be encompassed. This invention is not to be limited by the embodiments disclosed, including any shown in the drawings or exemplified in the specification, which are given by way of example and not of limitation.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

All references throughout this application, for example patent documents including issued or granted patents or equivalents, patent application publications, and non-patent literature documents or other source material, are hereby incorporated by reference herein in their entireties, as though individually incorporated by reference, to the extent each reference is at least partially not inconsistent with the disclosure in the present application (for example, a reference that is partially inconsistent is incorporated by reference except for the partially inconsistent portion of the reference).

We claim:

1. An aging resistant emulsified asphalt composition comprising a first phase and a second phase; wherein the first phase comprises from about 30% to about 70% of an aging resistant asphalt composition by weight of the total aging resistant emulsified asphalt composition; and wherein the second phase comprises from about 70% to about 30% of water and at least one emulsifier by weight of the total aging resistant emulsified asphalt composition; and wherein a cured residue of the aging resistant emulsified asphalt composition has a measured change in BBR failure temperature between an RTFO plus 20-hour PAV-aged residue sample of the aging resistant emulsified asphalt composition and an RTFO plus 40-hour PAV-aged residue sample of the aging resistant emulsified asphalt composition of less than about 3.5° C.,
wherein the aging resistant asphalt composition further has a SARA fraction composition of about 40% to about 60% by weight naphthene aromatics, about 25% to about 45% by weight polar aromatics, about 3% to about 8% by weight saturates, and about 3% to about 15% by weight asphaltenes.

2. The aging resistant emulsified asphalt composition of claim 1, wherein the cured residue has a colloidal index within the range of about 2.5 to about 8.0.

3. The aging resistant emulsified asphalt composition of claim 1, wherein the cured residue after RTFO plus 60-hour PAV-aging has a measured G-R parameter value at 15° C. and 0.005 rad/s less than 350.0 kPa.

4. The aging resistant emulsified asphalt composition of claim 1, wherein the cured residue of the aging resistant asphalt emulsion after RTFO plus 60-hour PAV-aging has crossover temperature calculated from the parameters of master curve developed with G-R frequency sweep test data at 15° C. reference temperature less than 32° C.

5. The aging resistant emulsified asphalt composition of claim 1 wherein a G-R parameter value at 150° C. and 0.005 rad/s of an RTFO plus 40 hour PAV-aged residue sample of the aging resistant asphalt composition is less than 350.0 kPa.

6. The aging resistant emulsified asphalt composition of claim 1, wherein the crossover temperature calculated from the parameters of a master curve developed with G-R frequency sweep test data at 15° C. reference temperature of an RTFO plus 40-hour PAV-aged residue sample of the aging resistant asphalt composition is less than 30° C.

7. The aging resistant emulsified asphalt composition of claim 1 wherein a change in the naphthene aromatics fraction of a non-aged sample of the aging resistant asphalt composition and an RTFO plus 60 hour PAV-aged residue sample of the aging resistant asphalt composition is less than about 45 percent.

8. The aging resistant emulsified asphalt composition of claim 1, wherein a change in the asphaltenes fraction of a non-aged sample of the aging resistant asphalt composition and an RTFO plus 60 hour PAV-aged residue sample of the aging resistant asphalt composition is less than about 25 percent.

9. The emulsified asphalt composition of claim 1, wherein a measured change in the colloidal index of a non-aged sample of the aging resistant asphalt composition and an RTFO plus 60-hour PAV-aged residue sample of the aging resistant asphalt composition is less than about 25 percent.

10. The emulsified asphalt composition of claim 1, wherein the emulsifier is substantially devoid of intramolecular hydrogen bonds, or intermolecular hydrogen bonds associated with a hydroxyl group as determined by FTIR spectroscopy.

11. The emulsified asphalt composition of claim 10, wherein the emulsifier is substantially devoid of free hydroxide anions.

12. The emulsified asphalt composition of claim 1, wherein the emulsifier is substantially devoid of intermolecular hydrogen bond associated with a primary amine, a secondary amine, or an amide.

13. The emulsified asphalt composition of claim 1, wherein the emulsifier is essentially free of free sulfhydryl, sulfonic acid, or sulfone groups.

14. The emulsified asphalt composition of claim 1, wherein the emulsifier is substantially devoid of an unsaturated carbon in the form of ketone or carboxylic acid or dicarboxylic anhydrides.

15. The emulsified asphalt composition of claim 1, wherein the emulsifier is substantially devoid of an unsaturated carbon associated with another carbon atom or heteroatom or alkyl group or an aryl group or as a cyclic compound.

16. The composition of claim 1, wherein the emulsifier is essentially free of ester groups in the form of formates or acetates or benzoates.

* * * * *